(12) United States Patent
Dohta

(10) Patent No.: US 7,815,508 B2
(45) Date of Patent: Oct. 19, 2010

(54) GAME DEVICE AND STORAGE MEDIUM STORING GAME PROGRAM

(75) Inventor: Takuhiro Dohta, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 734 days.

(21) Appl. No.: 11/637,034

(22) Filed: Dec. 12, 2006

(65) Prior Publication Data

US 2008/0076567 A1    Mar. 27, 2008

(30) Foreign Application Priority Data

Sep. 13, 2006   (JP)   ............... 2006-248721

(51) Int. Cl.
*G06F 17/00* (2006.01)

(52) U.S. Cl. ........................................ 463/37

(58) Field of Classification Search ............ 463/37, 463/39, 40, 42
See application file for complete search history.

(56) References Cited

U.S. PATENT DOCUMENTS

| | | | |
|---|---|---|---|
| 4,787,051 A | 11/1988 | Olson | |
| 4,839,838 A | 6/1989 | LaBiche et al. | |
| 5,421,590 A | 6/1995 | Robbins | |
| 5,506,605 A | 4/1996 | Paley | |
| 5,552,807 A | 9/1996 | Hayes et al. | |
| 5,605,505 A | 2/1997 | Han | |
| 5,864,333 A | 1/1999 | O'Heir | |
| 5,919,149 A | 7/1999 | Allum | |
| 6,059,576 A | 5/2000 | Brann | |
| 6,304,250 B1 | 10/2001 | Yang et al. | |
| 6,712,692 B2 | 3/2004 | Basson et al. | |
| 6,749,432 B2 | 6/2004 | French et al. | |
| 6,757,068 B2 | 6/2004 | Foxlin | |

(Continued)

FOREIGN PATENT DOCUMENTS

JP       07-185131       7/1995

(Continued)

OTHER PUBLICATIONS

Hinckley, "Haptic Issues for Virtual Manipulation: A Dissertation", Presented to the Faculty of the School of Engineering and Applied Science at the University of Virginia, Dec. 1996, 216 pages.

(Continued)

*Primary Examiner*—Ronald Laneau
(74) *Attorney, Agent, or Firm*—Nixon & Vanderhye P.C.

(57) ABSTRACT

A game device obtains first data from a first sensor and second data from a second sensor, wherein the first data represents a value according to an orientation or movement of a first input device, and the second data represents a value according to an orientation or movement of the second input device. Moreover, based on the first data and the second data, a degree of similarity between a state of the first input device with respect to the orientation or movement thereof and a state of the second input device with respect to the orientation or movement thereof is calculated. The amount of change by which to change the value of a game parameter used in the game process is calculated based on at least one of the first data and the second data so that the amount of change is greater as the degree of similarity is greater.

36 Claims, 18 Drawing Sheets

U.S. PATENT DOCUMENTS

| | | | |
|---|---|---|---|
| 6,850,844 | B1 | 2/2005 | Walters et al. |
| 7,182,691 | B1 | 2/2007 | Schena |
| 7,183,480 | B2 | 2/2007 | Nishitani et al. |
| 7,292,151 | B2 | 11/2007 | Ferguson et al. |
| 7,301,648 | B2 | 11/2007 | Foxlin |
| 2003/0018449 | A1 | 1/2003 | Couvillion, Jr. et al. |
| 2003/0057808 | A1 | 3/2003 | Lee et al. |
| 2003/0222851 | A1 | 12/2003 | Lai et al. |
| 2004/0147317 | A1 | 7/2004 | Ito et al. |
| 2004/0252109 | A1 | 12/2004 | Trent Jr., et al. |
| 2005/0020369 | A1 | 1/2005 | Davis et al. |
| 2005/0054457 | A1 | 3/2005 | Eyestone et al. |
| 2005/0070359 | A1 | 3/2005 | Rodriquez et al. |
| 2005/0134555 | A1 | 6/2005 | Liao |
| 2006/0094502 | A1 | 5/2006 | Katayama et al. |
| 2006/0123146 | A1 | 6/2006 | Wu et al. |
| 2006/0231794 | A1 | 10/2006 | Sakaguchi et al. |
| 2006/0252477 | A1 | 11/2006 | Zalewski et al. |
| 2007/0015588 | A1 | 1/2007 | Matsumoto et al. |
| 2008/0076566 | A1* | 3/2008 | Miyamoto .................. 463/37 |
| 2008/0132338 | A1* | 6/2008 | Yoshida ........................ 463/43 |
| 2008/0132339 | A1* | 6/2008 | Taira ......................... 463/43 |
| 2008/0254898 | A1* | 10/2008 | Endo .......................... 463/43 |
| 2009/0144020 | A1* | 6/2009 | Ohta et al. .................. 702/160 |

FOREIGN PATENT DOCUMENTS

| | | |
|---|---|---|
| JP | 2002-153673 | 5/2002 |
| JP | 2002-200339 | 7/2002 |
| WO | 97/12337 | 4/1997 |
| WO | 2004/039055 | 5/2004 |

OTHER PUBLICATIONS

"LPC2104/2105/2106, Single-chip 32-bit microcontrollers; 128 kB ISP/IAP Flash with 64 kB/32 kB/16 kB RAM", Phillips, Dec. 22, 2004; 32 pages.

"MEMS enable smart golf clubs" Small Times - MEMS enable smart golf clubs, Jan. 6, 2005, 2 pages.

Swisher "How Science Can Improve Your Golf Game, Your Club is Watching" The Wall Street Journal, Apr. 18, 2005, 1 page.

Smartswing internal drawing, 1 page.

Regan, "Smart Golf Clubs", The Baltimore Sun, Jun. 17, 2005, 1 page.

FrontSide Field Test, "Get This!", Golf Magazine, Jun. 2005, p. 36.

Achenbach, "Golfs New Measuring Stick," Golfweek, Jun. 11, 2005; 1 page.

Training Aid, SmartSwing, PGA Magazine, Apr. 2005, p. 46.

Wilson et al., "Demonstration of the XWand Interface for Intelligent Spaces", UIST '02 Companion, pp. 37-38, 2002.

Wilson et al., "Gesture Recognition Using the XWand" Tech. Report CMU-RI-TR-04-57, Robotics Institute, Carnegie Mellon University, Apr. 2004, 11 pages.

Wilson, "XWand: UI for Intelligent Environments", Apr. 26, 2004, 5 pages.

Wilson et al., "XWand: UI for Intelligent Spaces", CHI 2003, Apr. 6-10, 2003, 8 pages.

Hinckley, "Synchronous Gestures for Multiple Persons and Computers", UIST 2003 Symposium on User Interface Software and Technology, 2003, 10 pages.

Benbasat et al., "An Inertial Measurement Framework for Gesture Recognition and Applications", GW 2001, LNAI 2298, pp. 9-20, 2002.

Ballagas et al., "iStuff: A Phyiscal User Interface Toolkit for Ubiquitous Computing Environments", CHI 2003, Apr. 5-10, 2003, Ft. Lauderdale FL, vol. No. 5, Issue No. 1, pp. 537-544.

Verplaetse, "Inertial Proprioceptive Devices: Self-Motion-Sensing Toys and Tools", IBM Systems Journal, vol. 35, Nos. 3 &4, 1996, pp. 639-650.

Yang et al., "Implementation and Evaluation of"Just Follow Me": An Immersive, VR-Based, Motion-Training System", Presence: vol. 11, No. 3, Jun. 2002, pp. 304-323.

Hinckley et al., "Sensing Techniques for Mobile Interaction," ACM UIST 2000, Symposium on User Interface Software and Technology, CHI Letters 2 (2), pp. 91-100, 2000.

Kunz et al., "Design and Construction of a New Haptic Interface", Proceedings of DETC'00, ASME 2000 Design Engineering Technical Conferences and Computers and Information in Engineering Conference, Sep. 10-13, 2000, 6 pages.

Merians, et al. "Virtual Reality-Augmented Rehabilitation for Patients Following Stroke", Physical Therapy, vol. 82, No. 9, Sep. 2002, pp. 898-915.

Bachmann et al., "Orientation Tracking for Humans and Robots Using Inertial Sensors", 1999 International Symposium on Computational Intelligence in Robotics & Automation (CIRA99), 1999, 8 pages.

"Kirby Tilt n' Tumble", Game Boy Instruction Booklet, 2001, 18 pages.

A. Fujii et al., Pointing device for notebook computer, Feb. 11, 2001, Pub. No. JP2001-306245A.

Office Action dated Mar. 21, 2010 in related U.S. Appl. No. 11/488,135.

European Search Report dated Jul. 7, 2010 in corresponding European Patent Application No. 06026537.

* cited by examiner

| | CONTROLLER POSITIONS | ACCELERATION VECTOR |
|---|---|---|
| POSITION A |  |  $A_{XY}=0$ |
| POSITION B |  |  $A_{XY}$ |
| POSITION C |  |  $A_{XY}$ |

| | OPERATION | ACTION |
|---|---|---|
| FIRST OPERATION |  | RIGHT HAND OBJECT TURNED/MOVED |
| SECOND OPERATION |  | LEFT HAND OBJECT TURNED/MOVED |
| THIRD OPERATION |  | TORSO OBJECT MOVED (RIGHT HAND AND LEFT HAND OBJECTS TURNED/MOVED) |

GAME DEVICE AND STORAGE MEDIUM
STORING GAME PROGRAM

CROSS REFERENCE TO RELATED
APPLICATION

The disclosure of Japanese Patent Application No. 2006-248721, filed on Sep. 13, 2006, is incorporated herein by reference.

BACKGROUND AND SUMMARY

1. Field of the Invention

The present invention relates to a game device and a storage medium storing a game program and, more particularly, to a game device and a storage medium storing a game program for a video game where the player uses two input devices.

2. Description of the Background Art

There are conventional video games of the type where the player controls a plurality of control objects at the same time. In a boxing game of this type, the player separately controls the left hand and the right hand of the boxer (player object), and in some cases also separately controls the body of the boxer. In such a case, the player controls three control objects at the same time, i.e., the left and right hands of the boxer and the body of the boxer as a whole.

Examples of such boxing games include those disclosed in Patent Document 1 (Japanese Laid-Open Patent Publication No. 2002-200339), Patent Document 2 (Japanese Laid-Open Patent Publication No. 07-185131) and Patent Document 3 (Japanese Laid-Open Patent Publication No. 2002-153673), for example. Patent Document 1 discloses a game device in which the player controls various parts of the player object. The game device employs, as input devices, a pair of (left and right) controllers each including acceleration sensors for three axial directions. The moving direction and the acceleration of the pair of controllers are detected by using the acceleration signals obtained from the controllers, based on which the punching action of the player object is controlled.

Patent Document 2 discloses a game system in which the player controls various parts of the player object. In the game system, markers are attached to various parts of the body of the player, e.g., head, hands, arms, legs, torso, etc., based on which the movement of the player object is controlled. The game system detects the position of each marker based on an image of the player captured by a video camera, and controls the various parts of the player object so as to follow the movement of the player, based on the detected positions.

Patent Document 3 discloses the use of two controllers separately detecting the movement in at least two axial directions. The player holds and moves the two controllers, one in the left hand and the other in the right hand, and the controllers output signals according to the movement of the controllers. Using these signals, the game device controls the punching action of the player object, i.e., the movement of the two hands of the player object. In addition to the two controllers, the game device also includes a head detecting section (being a CCD camera) for detecting the position of the head of the player. The output from the head detecting section is used to control the viewpoint of the game image, i.e., the movement of the head of the player object.

The game device of Patent Document 1 uses two controllers as input devices so as to control the punching action of the player object, i.e., the movement of the two hands of the player object. However, Patent Document 1 fails to give any consideration to the movement other than the movement of the two hands. Therefore, with Patent Document 1, the player cannot move other parts or the body as a whole of the player object. Thus, the player cannot control three control objects at the same time.

With Patent Document 2, markers are attached to various parts of the player, whereby it is possible to control various parts of the player object corresponding to the various parts of the player. In Patent Document 3, with the provision of the head detecting section (camera) in addition to the two controllers, it is possible to control three parts of the player object, i.e., the two hands and the head. However, Patent Documents 2 and 3 require additional components, such as the camera, whereby the device as a whole is complicated, large in size and expensive.

Patent Documents 1 and 3 both disclose the use of two input devices each controlled while being held in hand. However, the two input devices are only controlled separately, but not in a coordinated manner so that the game device can detect the coordinated movement of the input devices as such.

Therefore, a feature of the illustrative implementations is to provide a game device and a game program, which with a simple configuration enables the player to control a plurality of objects.

Another feature of the illustrative implementations is to provide a game device and a game program, which enables the player to move two input devices in a coordinated manner so that the coordinated movement is detected as such.

An illustrative implementation has the following features to attain the objects mentioned above. Note that parenthetic expressions in the following section (reference numerals, supplementary explanations, etc.) are merely to indicate the correlation between what is described in the following section and what is described in the description of the preferred embodiments set out further below in the present specification, and are in no way intended to restrict the scope of the present invention.

A first aspect of any illustrative implementation is directed to a computer-readable storage medium, storing a game program (71) to be executed by a computer (the CPU 10, etc.) of a game device (3) for performing a game process based on data outputted from a first sensor (the acceleration sensor 37) and data outputted from a second sensor (the acceleration sensor 55), wherein the first sensor outputs first data (the first acceleration data 721) representing a value according to an orientation or movement of a first input device (the main controller 5a) and the second sensor outputs second data (the second acceleration data 722) representing a value according to an orientation or movement of a second input device (the sub-controller 5b). The game program instructs the computer to perform a data obtaining step (S1), a similarity degree calculating step (S11, S12, S21, S23, and S24), and a change amount calculating step (S25). The data obtaining step is a step of obtaining the first data and the second data. The similarity degree calculating step is a step of calculating, based on the first data and the second data, a degree of similarity between a state of the first input device with respect to the orientation or movement thereof and a state of the second input device with respect to the orientation or movement thereof. The change amount calculating step is a step of calculating, based on at least one of the first data and the second data, an amount of change by which to change a value of a game parameter to be used in the game process (the amount by which the torso object 63 is moved) in such a manner that the amount of change is greater as the degree of similarity is greater.

In a second aspect, in the change amount calculating step, the computer calculates an amount of movement by which to move a first object (the torso object 63) in a game space in such a manner that the amount of movement is greater as the degree of similarity is greater.

In a third aspect, the game program instructs the computer to further perform an object movement step. The object movement step is a step of moving a second object (the right hand object 61) in the game space based on the first data and moving a third object (the left hand object 62) in the game space based on the second data.

In a fourth aspect, the first object is an object representing a torso or a head of a human-shaped character. One of the second object and the third object is an object representing a right hand of the human-shaped character and the other is an object representing a left hand thereof.

In a fifth aspect, the first sensor is an acceleration sensor outputting data representing an acceleration as the first data. The second sensor is an acceleration sensor outputting data representing an acceleration as the second data.

In a sixth aspect, the game program instructs the computer to further perform a first determination step (S3) and a second determination step (S5). The first determination step is a step of determining, based on the first data, whether the first input device is subjected to an operation (the punch operation) that gives a rapid change to an orientation or position of the first input device, the degree of rapidness of the rapid change being greater than or equal to a predetermined degree. The second determination step is a step of determining, based on the second data, whether the second input device is subjected to an operation (the punch operation) that gives a rapid change to an orientation or position of the second input device, the degree of rapidness of the rapid change being greater than or equal to a predetermined degree. In the similarity degree calculating step, the computer calculates a degree of similarity between the orientation of the first input device and that of the second input device only if a determination result of the first determination step and that of the second determination step are both false.

In a seventh aspect, the game program instructs the computer to further perform an action control step (S4 or S6). The action control step is a step of activating a predetermined action (the punch action) of the first object or other objects only if at least one of the determination result of the first determination step and that of the second determination step is true. In the change amount calculating step, the computer calculates, as the amount of change, an amount of movement by which the first object is moved in a game space only if the determination result of the first determination step and that of second determination step are both false.

An eighth aspect of an illustrative implementation is directed to a computer-readable storage medium, storing a game program (71) to be executed by a computer (the CPU 10, etc.) of a game device (3) for performing a game process based on data outputted from a first sensor (the acceleration sensor 37) and data outputted from a second sensor (the acceleration sensor 55), wherein the first sensor outputs first data (the first acceleration data 721) representing a value according to an orientation or movement of a first input device (the main controller 5a) and the second sensor outputs second data (the second acceleration data 722) representing a value according to an orientation or movement of a second input device (the sub-controller 5b). The game program instructs the computer to perform a data obtaining step (S1), a similarity degree calculating step (S11, S21, S23, and S24), a first game process step (S14), and a second game process step (S25 to S27). The data obtaining step is a step of obtaining the first data from the first sensor and the second data from the second sensor. The similarity degree calculating step is a step of calculating, based on the first data and the second data, a degree of similarity between a state of the first input device with respect to the orientation or movement thereof and a state of the second input device with respect to the orientation or movement thereof. The first game process step is a step of performing a first game process based on the first data or the second data. The second game process step is a step of performing a second game process based on the first data and the second data only if a value of the degree of similarity is greater than a predetermined value.

In a ninth aspect, in the second game process step, the computer performs, as the second game process, a process of calculating, based on at least one of the first data and the second data, an amount of change (the amount by which the torso object 63 is moved) by which to change a value of a game parameter to be used in the game process in such a manner that the amount of change is greater as the degree of similarity is greater.

In a tenth aspect, the first sensor is an acceleration sensor outputting data representing an acceleration as the first data. The second sensor is an acceleration sensor outputting data representing an acceleration as the second data.

In an eleventh aspect, the first data represents an acceleration value with respect to a predetermined axial direction (the X-axis direction shown in FIG. 3) with reference to the first input device. The second data represents an acceleration value with respect to a predetermined axial direction (the X-axis direction shown in FIG. 6) with reference to the second input device. In the similarity degree calculating step, the computer calculates the degree of similarity based on a difference (the difference C) between a value of the first data and a value of the second data.

In a twelfth aspect, the degree of similarity calculated in the similarity degree calculating step takes a higher value as the difference is smaller.

In a thirteenth aspect, the first data represents a vector ($A1_{XY}$) whose components are acceleration values with respect to a plurality of predetermined axial directions (the X-axis direction and the Y-axis direction) with reference to the first input device. The second data represents a vector ($A2_{XY}$) whose components are acceleration values with respect to a plurality of predetermined axial directions with reference to the second input device. In the similarity degree calculating step, the computer calculates the degree of similarity based on a difference between a vector represented by the first data and a vector represented by the second data.

In a fourteenth aspect, the degree of similarity calculated in the similarity degree calculating step takes a higher value as the difference between the vectors is smaller.

In a fifteenth aspect, the first data represents a vector whose components are acceleration values with respect to a plurality of predetermined axial directions with reference to the first input device. The second data represents a vector whose components are acceleration values with respect to a plurality of predetermined axial directions with reference to the second input device. In the similarity degree calculating step, the computer calculates the degree of similarity based on a difference between a vector representing an amount of change in the vector represented by the first data over a predetermined amount of time and a vector representing an amount of change in the vector represented by the second data over the predetermined amount of time.

In a sixteenth aspect the degree of similarity calculated in the similarity degree calculating step takes a higher value as the difference between the vectors is smaller.

In a seventeenth aspect, the first data represents a vector whose components are acceleration values with respect to a plurality of predetermined axial directions with reference to the first input device. The second data represents a vector whose components are acceleration values with respect to a plurality of predetermined axial directions with reference to the second input device. In the similarity degree calculating step, the computer calculates the degree of similarity based on an angular difference between a vector representing an amount of change in the vector represented by the first data over a predetermined amount of time and a vector representing an amount of change in the vector represented by the second data over the predetermined amount of time.

In an eighteenth aspect, the degree of similarity calculated in the similarity degree calculating step takes a higher value as the angular difference between the vectors is smaller.

In a nineteenth aspect, the first data represents a vector whose components are acceleration values with respect to a plurality of predetermined axial directions with reference to the first input device. The second data represents a vector whose components are acceleration values with respect to a plurality of predetermined axial directions with reference to the second input device. In the similarity degree calculating step, the computer calculates the degree of similarity based on an angular difference between a vector represented by the first data and a vector represented by the second data.

In a twentieth aspect, the degree of similarity calculated in the similarity degree calculating step takes a higher value as the angular difference between the vectors is smaller.

In a twenty-first aspect, the first sensor outputs vector data (the acceleration data) representing an orientation of the first input device as the first data, and the second sensor outputs vector data (the acceleration data) representing an orientation of the second input device as the second data. In the similarity degree calculating step, the computer calculates a degree of similarity between an orientation of the first input device and an orientation of the second input device.

The present invention may be in the form of a game device having equal functions to those of a game device capable of performing the steps described above.

According to the first aspect, the amount of change, which is calculated based on at least one of the first data and the second data, is greater as the degree of similarity is greater. Thus, the amount of change is large when two input devices are moved similarly. Therefore, the player can play the game by an operation of moving the two input devices in a coordinated manner. As the two input devices are moved more similarly, the effect of the operation (i.e., the amount of change) is greater. Therefore, the player is required to learn the skill of moving the two input devices in a coordinated manner. Thus, the player is given a challenging novel operation. Moreover, according to the first aspect, the operation of separately moving the two input devices has little effect on the amount of change, whereby the operation of separately moving the input devices can be used independently of the operation of controlling the amount of change. Therefore, if the first aspect of the present invention is used where a plurality of control objects are controlled with two input devices, it is possible to easily control the plurality of control objects.

According to the second aspect, an object can be moved in the game space through an operation of moving two input devices in a coordinated manner.

According to the third aspect, the first object can be controlled by moving the first input device, the second object can be controlled by moving the second input device, and the third object can be controlled by moving both the first and second input devices. Therefore, three control objects can be controlled simultaneously with a simple configuration using two input devices.

According to the fourth aspect, the two hands and the torso of a human-shaped object can be controlled separately by using two input devices.

According to the fifth aspect, an acceleration sensor is provided in the input device, whereby the orientation or movement of the input device can easily be calculated based on the output data from the acceleration sensor. Thus, the degree of similarity can easily be calculated based on the calculated orientation or movement.

According to the sixth aspect, when either input device is moved rapidly, the degree of similarity is not calculated, and the amount of change is not calculated. When an input device having an acceleration sensor therein is moved rapidly, it may not be possible to accurately calculate the inclination or the movement of the input device based on the output from the acceleration sensor. According to the sixth aspect, however, it is possible to prevent such an inaccurate calculation.

According to the seventh aspect, an object can be moved in the game space through the operation of moving two input devices in a coordinated manner, and another operation can be performed by rapidly moving an input device.

According to the eighth aspect, the first game process is performed through an operation of moving the first input device or the second input device, and the second game process is performed through an operation of moving the first input device and the second input device. Therefore, a plurality of types of game operations can be done with a simple configuration using two input devices. If the two input devices are moved separately so that the degree of similarity is less than or equal to a predetermined degree, the second game process is not performed. Therefore, when the player moves the input devices separately intending to perform the first game process, the second game process, which is not intended by the player, will not be performed, thus providing an improved controllability in a video game using two input devices.

According to the ninth aspect, as the two input devices are moved more similarly, the effect of the operation (i.e., the amount of change) is greater. Therefore, the player is required to learn the skill of moving the two input devices in a coordinated manner. Thus, the player is given a challenging novel operation.

According to the tenth aspect, an acceleration sensor is provided in the input device, whereby the orientation or movement of the input device can easily be calculated based on the output data from the acceleration sensor. Thus, the degree of similarity can easily be calculated based on the calculated orientation or movement.

According to the eleventh and twelfth aspects, the degree of similarity is calculated based on the acceleration in a single axial direction, whereby it is possible to easily calculate the orientation of each input device, and to easily calculate the degree of similarity between the orientations of the input devices.

According to the thirteenth, fourteenth, nineteenth and twentieth aspects, the degree of similarity is calculated based on the acceleration in multiple axial directions, whereby it is possible to accurately calculate the orientation of each input device, and to accurately calculate the degree of similarity between the orientations of the input devices.

According to the fifteenth to eighteenth aspects, the degree of similarity is calculated based on the amount of change in the acceleration in multiple axial directions, whereby it is possible to accurately calculate the movement of each input device (including the change in the orientation thereof), and to accurately calculate the degree of similarity between the movements of the input devices. Moreover, it is possible to provide a video game with a novel game operation of moving two input devices in a coordinated manner so that the movements of the two input devices (including the change in the orientation thereof) are the same.

According to the twenty-first aspect, it is possible to provide a video game with a novel game operation of moving two input devices in a coordinated manner so that the orientations of the two input devices are the same.

These and other objects, features, aspects and advantages of the present illustrative implementations will become more apparent from the following detailed description of the illustrative implementations when taken in conjunction with the accompanying drawings.

BRIEF DESCRIPTION OF THE DRAWINGS

FIG. 3 is a perspective view showing an external configuration of a main controller 5a;

FIG. 4 is a perspective view showing an external configuration of the main controller 5a;

FIG. 5A shows an internal configuration of the main controller 5a;

FIG. 5B shows an internal configuration of the main controller 5a;

DESCRIPTION OF THE PREFERRED EMBODIMENTS

General Configuration of Game System

Figure 1:
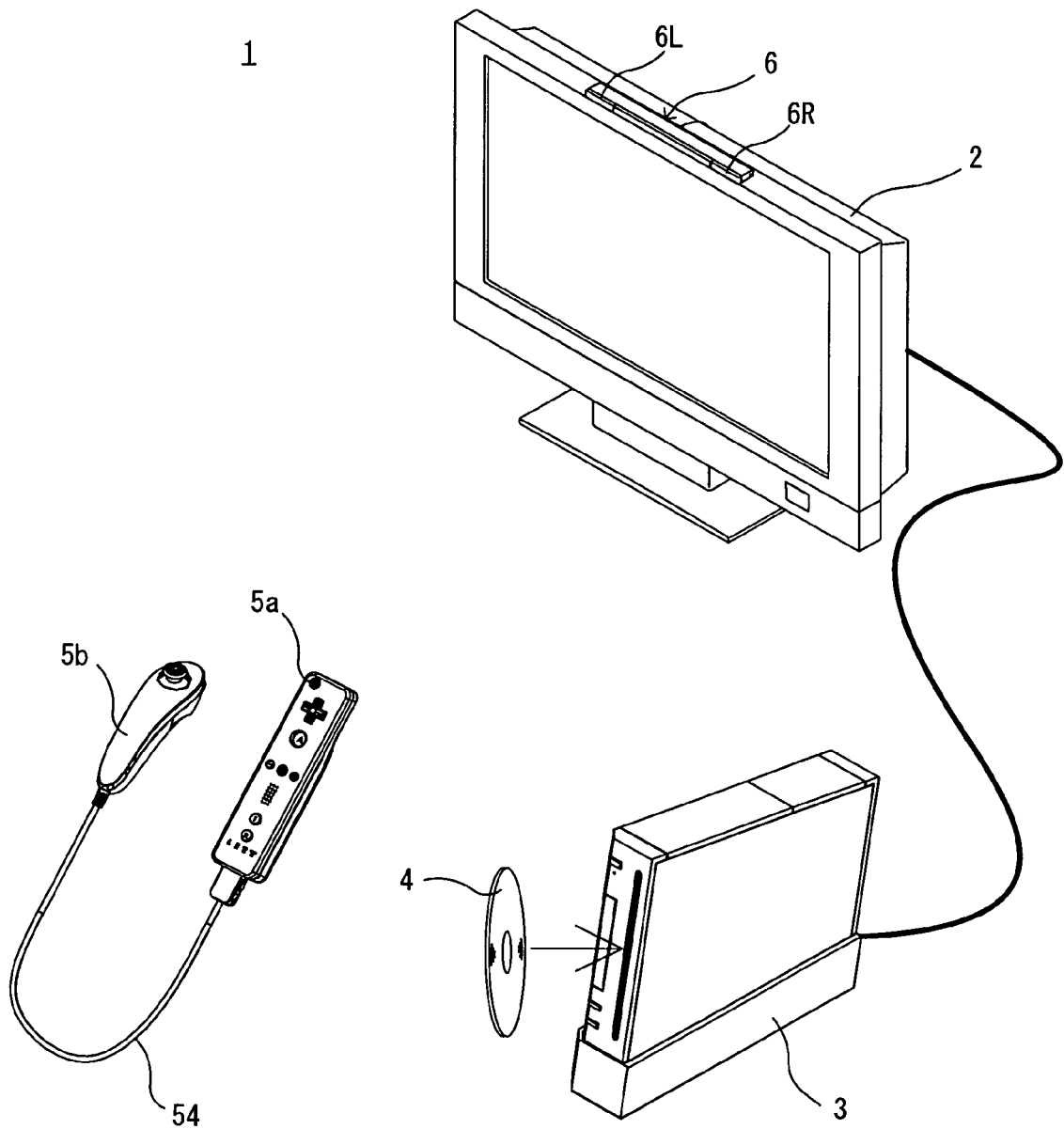
FIG. 1 is an external view of a game system 1.

Referring to FIG. 1, a game system 1 including a game device according to an embodiment of the present invention will now be described. FIG. 1 is an external view of the game system 1. The game device and the game program of the present embodiment will now be described with respect to a home-console type game device as an example. Referring to FIG. 1, the game system 1 includes a television set (hereinafter referred to simply as a "TV") 2, a game device 3, an optical disc 4, two controllers 5a and 5b, and a sensor bar 6. The present system performs a game process by the game device 3 based on a game operation using the two controllers 5a and 5b.

The game device 3 includes the optical disc 4, being an example of an information storage medium that can be received by the game device 3. The optical disc 4 stores a game program to be executed by the game device 3. Provided on the front side of the game device 3 is a slot for receiving the optical disc 4. The game device 3 performs a game process by loading and executing a game program stored in the optical disc 4 inserted through the slot.

The TV 2 is connected to the game device 3 via a connection cord. The TV 2 is a display device such as a home television set. The TV 2 shows a game image obtained as a result of the game process executed by the game device 3. The sensor bar 6 is provided around the TV 2 (on the upper side of the screen in FIG. 1). The sensor bar 6 includes two markers 6R and 6L at opposite ends thereof. Specifically, the markers 6R and 6L are one or more infrared LEDs for outputting infrared light to the front side of the TV 2. The sensor bar 6 is connected to the game device 3, and the game device 3 can control ON/OFF of the infrared LEDs of the sensor bar 6.

The controllers 5a and 5b are each an input device for giving the game device 3 operation data, which represents the player's operation on the controller. Hereinafter, the controller 5a will be referred to as the "main controller", and the controller 5b as the "sub-controller". The main controller 5a and the game device 3 are connected via a wireless connection. In the present embodiment, the wireless connection between the main controller 5a and the game device 3 employs Bluetooth (registered trademark), for example. In other embodiments, the main controller 5a and the game device 3 may be connected via a wired connection. The main controller 5a and the sub-controller 5b are connected to each other via a flexible cable 54. In other embodiments, the main controller 5a and the sub-controller 5b may wirelessly communicate with each other. While the sub-controller 5b communicates with the game device 3 via the main controller 5a in the present embodiment, there may be a wireless or wired direct connection between the sub-controller 5b and the game device 3.

(Internal Configuration of Game Device 3)

Figure 2:
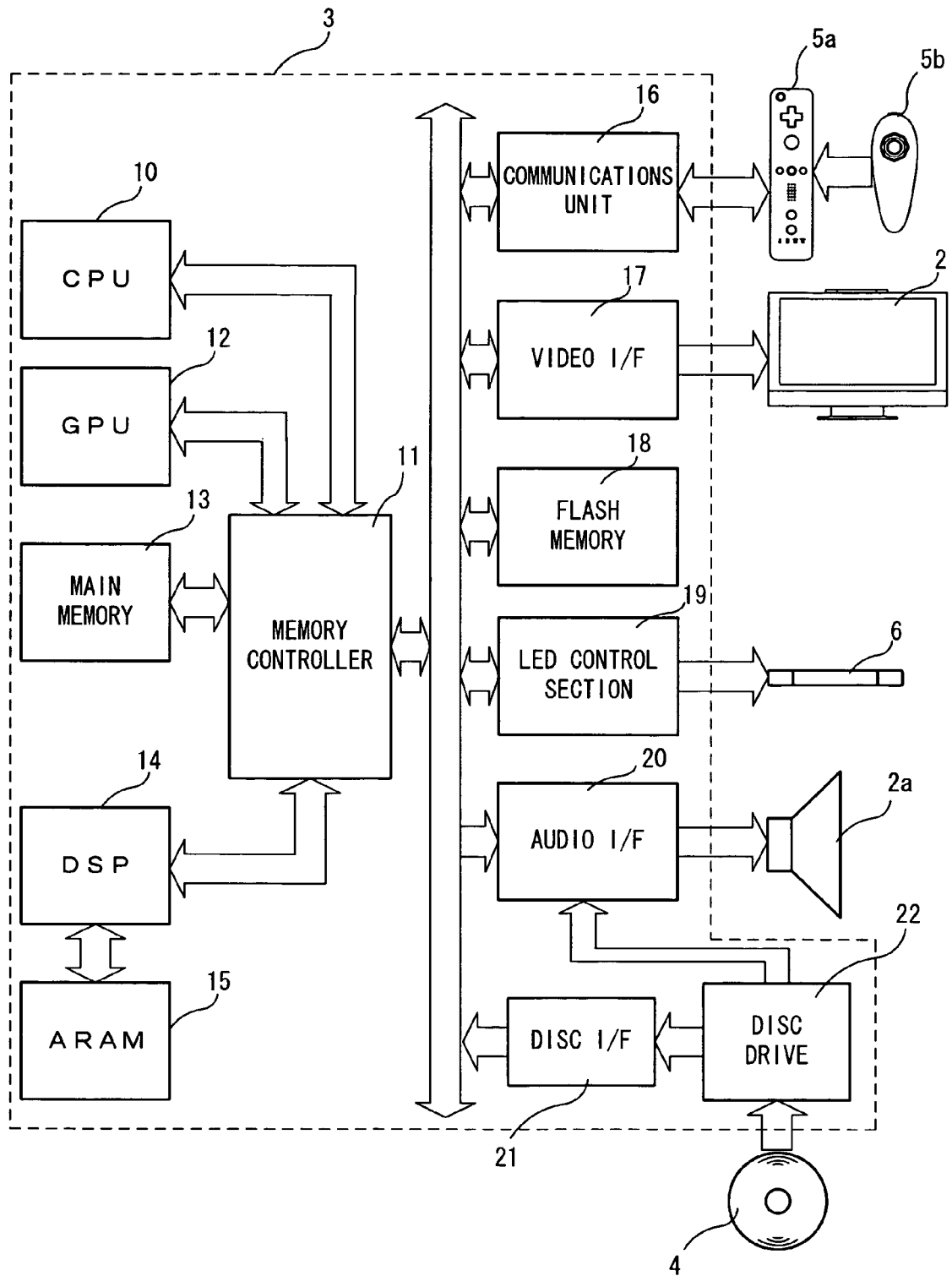
FIG. 2 is a functional block diagram of a game device 3.

Referring now to FIG. 2, the configuration of the game device 3 will be described. FIG. 2 is a functional block diagram of the game device 3.

Referring to FIG. 2, the game device 3 includes a CPU (central processing unit) 10, for example, for executing various programs. The CPU 10 executes a boot program stored in a boot ROM (not shown), thus initializing memory devices, such as a main memory 13, and then executes a game program stored in the optical disc 4 to perform a game process, etc., according to the game program. Connected to the CPU 10 via a memory controller 11 are a GPU (Graphics Processing Unit) 12, the main memory 13, a DSP (Digital Signal Processor) 14, an ARAM (Audio RAM) 15, etc. The memory controller 11 is connected, via a predetermined bus, to the communications unit 16, a video I/F (interface) 17, a flash memory 18, an LED control section 19, an audio I/F 20 and a disc I/F 21. The video I/F (interface) 17 is connected to the TV 2, an LED control section 19 to the sensor bar 6, the audio I/F 20 to a speaker 2a provided in the TV 2 and to a disc drive 22, and the disc I/F 21 to the disc drive 22.

The GPU 12 is responsible for image processing based on instructions from the CPU 10, and is a semiconductor chip, for example, capable of computations necessary for 3D graphics display. The GPU 12 performs the image process by using a memory dedicated for image processing (not shown) or a part of the memory area of the main memory 13. The GPU 12 produces game image data or movie data to be displayed on the TV 2 using these memory areas, and outputs the produced data to the TV 2 via the memory controller 11 and the video I/F 17 as necessary.

The main memory 13 is a memory area used by the CPU 10, and stores a game program, etc., as necessary for processes performed by the CPU 10. For example, the main memory 13 stores the game program loaded from the optical disc 4 by the CPU 10 and various data, etc. The game program, the various data, etc., stored in the main memory 13 are executed or processed by the CPU 10.

The DSP 14 is for processing sound data, etc., produced by the CPU 10 when executing the game program, and is connected to the ARAM 15 for storing the sound data, etc. The ARAM 15 is used when the DSP 14 performs a predetermined process (e.g., storing a game program, sound data, etc., which have been loaded in advance). The DSP 14 reads out the sound data stored in the ARAM 15, and outputs the sound data through the speaker 2a via the memory controller 11 and the audio I/F 19.

The memory controller 11 is responsible for the overall control of data transfers, and is connected to the communications unit 16, the flash memory 18, the LED control section 19, and the various I/Fs 17, 20 and 21.

The communications unit 16 is responsible for data exchanges between the game device 3 and the main controller 5a. The sub-controller 5b transmits operation data to the main controller 5a, the operation data representing the player's operation on the sub-controller 5b. The main controller 5a transmits, to the game device 3, operation data representing the player's operation on the main controller 5a and the operation data received from the sub-controller 5b. Hereinafter, the operation data from the main controller 5a will be referred to as the "first operation data", and the operation data from the sub-controller 5b as the "second operation data". In a case where the sub-controller 5b can communicate directly with the game device 3, the sub-controller 5b may transmit the second operation data directly to the game device 3, whereas the main controller 5a transmits only the first operation data to the game device 3. The communications unit 16 receives various operation data from the main controller 5a, and outputs the received operation data to the CPU 10 via the memory controller 11. The CPU 10 performs a game process based on the operation data. In a case where control data for controlling the operation of the main controller 5a is transmitted to the main controller 5a, the control data is outputted to the communications unit 16. The communications unit 16 transmits the received control data to the main controller 5a.

The TV 2 is connected to the video I/F 17, and image data produced by the GPU 12 is outputted to the TV 2 via the video I/F 17. The flash memory 18 serves as a backup memory for statically storing save data, or the like. The game device 3 may reproduce a past game status from save data stored in the flash memory 18 to obtain a game image for that past game status, and display the obtained game image on the TV 2. The infrared LEDs of the sensor bar 6 are connected to the LED control section 19. When turning ON the infrared LEDs, the CPU 10 instructs the LED control section 19 to supply power to the infrared LEDs. The LED control section 19 supplies power to the infrared LEDs in response to the power supply instruction, thereby turning ON the infrared LEDs. The speaker 2a provided in the TV 2 is connected to the audio I/F 20, and the sound data read out by the DSP 14 from the ARAM 15 and the sound data directly from the disc drive 22 are outputted from the speaker 2a. The disc drive 22 is connected to the disc I/F 21. The disc drive 22 reads out data from the optical disc 4, being at a predetermined read position, and outputs the data to the disc I/F 21 and the audio I/F 20.

The game device 3 also includes a network communications section (not shown), and is thereby connected to a network such as the Internet. The game device 3 can send/receive data to/from the outside via the network communications section.

(Configuration of Main Controller 5a and Sub-Controller 5b)

Figure 3:
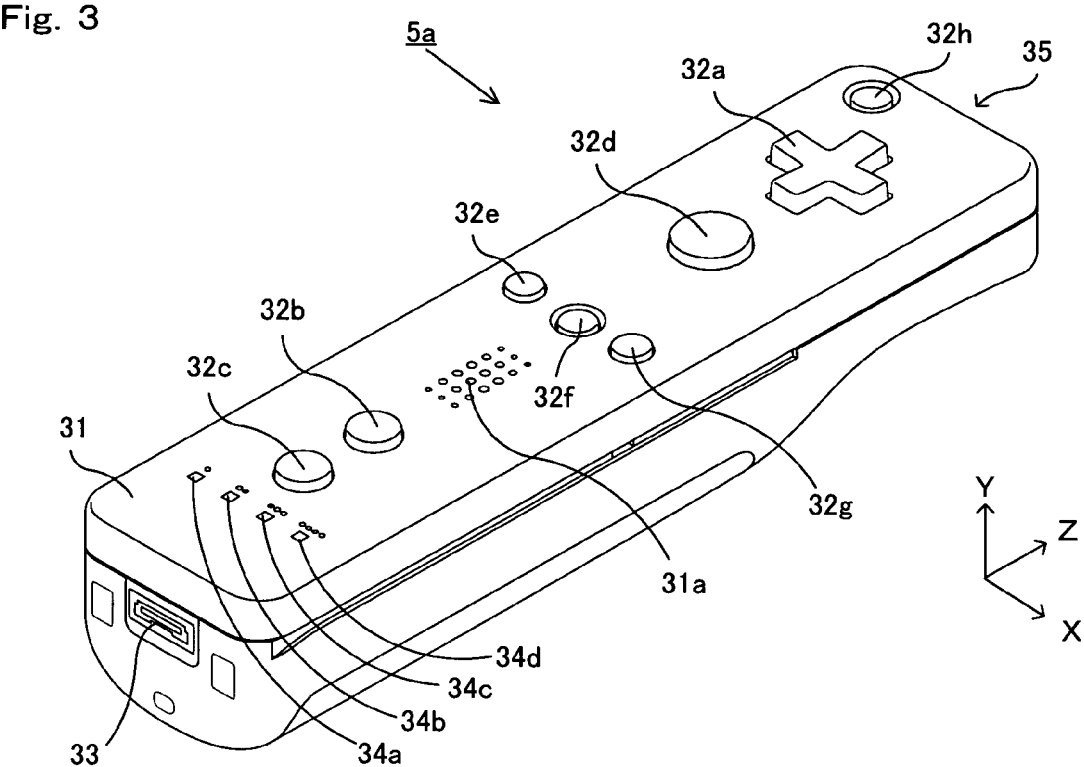
Figure 4:
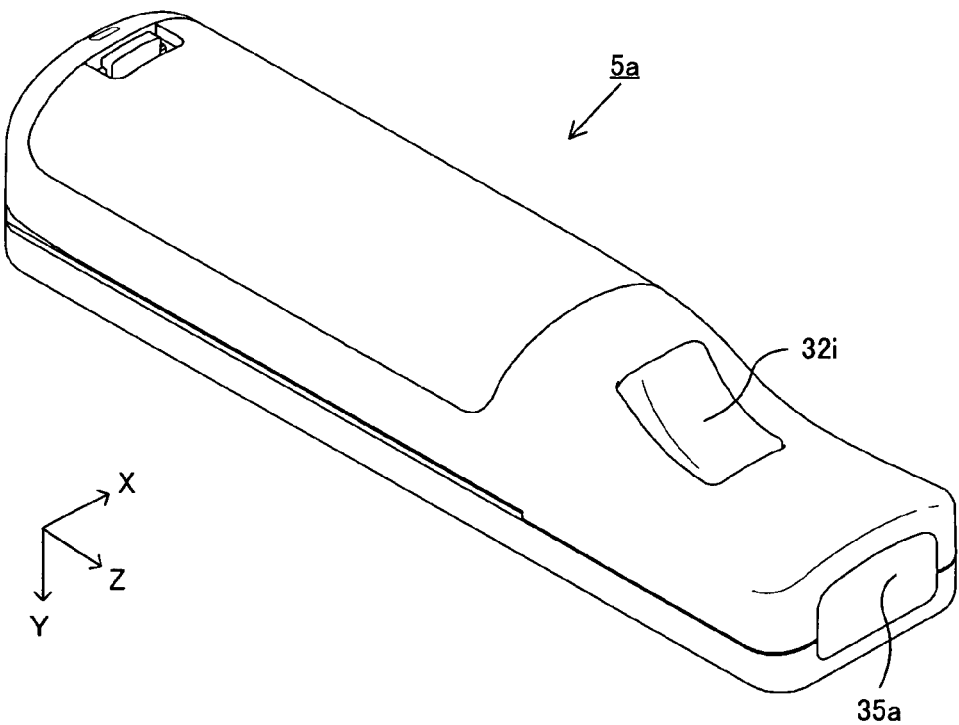

Referring now to FIGS. 3 to 9, the main controller 5a and the sub-controller 5b will be described. FIGS. 3 and 4 are perspective views each showing an external configuration of the main controller 5a. FIG. 3 is a perspective view of the main controller 5a as viewed from the upper rear side, and FIG. 4 is a perspective view thereof as viewed from the lower front side.

Referring to FIGS. 3 and 4, the main controller 5a includes a housing 31 formed by molding a plastic material, for example. The housing 31 has a generally rectangular parallelepiped shape, with the longitudinal direction being the front-rear direction (the Z-axis direction in FIG. 3), and has an overall size such that it can be held in a hand of an adult or a child. Using the main controller 5a, the player can perform a game operation by pressing down buttons provided on the main controller 5a and by moving the main controller 5a itself to change its position and orientation. For example, the player can control a control object by turning the main controller 5a or by changing the position on the screen pointed at by the main controller 5a. As used herein, "the position on the screen pointed at by the main controller 5a" is ideally the position at which the straight line extending in the longitudinal direction from the front end of the main controller 5a crosses the screen of the TV 2. However, it does not have to be precisely the position as long as a position in the vicinity thereof can be calculated by the game device 3. Hereinafter, the position on the screen pointed at by the main controller 5a will be referred to as "the pointed position (the position pointed at by the controller 5a)". Moreover, the longitudinal direction of the main controller 5a (the housing 31) may hereinafter be referred to as "the pointing direction (of the main controller 5a)".

The housing 31 includes a plurality of control buttons. Referring to FIG. 3, provided on the upper surface of the housing 31 are a cross-shaped key 32a, a first button 32b, a second button 32c, an A button 32d, a minus button 32e, a home button 32f, a plus button 32g, and a power button 32h. The power button 32h is for remotely turning ON/OFF the power of the game device 3. Referring to FIG. 4, a depressed portion is formed on the lower surface of the housing 31, and a B button 32i is provided on a slope on the rear side of the depressed portion. Each of these control buttons 32a to 32i is assigned a function as specified in the game program executed by the game device 3. The home button 32f and the power button 32h are buried under the upper surface of the housing 31. Thus, it is possible to prevent the player from unintentionally pressing the home button 32f or the power button 32h.

A connector 33 is provided on the rear side of the housing 31. The connector 33 is used for connecting other units (the sub-controller 5b in the illustrated example) to the main controller 5a.

Moreover, a plurality of (three in FIG. 3) LEDs 34a to 34d are provided on the upper surface of the housing 31 near the rear end. The main controller 5a is given a controller ID (number) for identifying the main controller from others. The LEDs 34 can be used for various purposes, e.g., for notifying the player of the controller ID being currently assigned to the main controller 5a, and for notifying the player of the remaining battery capacity of the main controller 5a. Specifically, when the main controller 5a is used to perform a game operation, one of the LEDs 34a to 34d is lit depending on the controller ID.

Moreover, the main controller 5a includes an image capturing/processing section 35 (FIG. 5B), and a light receiving port 35a of the image capturing/processing section 35 is provided on the front side of the housing 31 as shown in FIG. 4. The light receiving surface 35a is made of a material that at least transmits the infrared light from the markers 6R and 6L.

Sound slits 31a are formed in the upper surface of the housing 31 between the first button 32b and the home button 32f for allowing the sound from a speaker 49 (FIG. 5A) provided in the main controller 5a to pass therethrough.

Figure 5A:
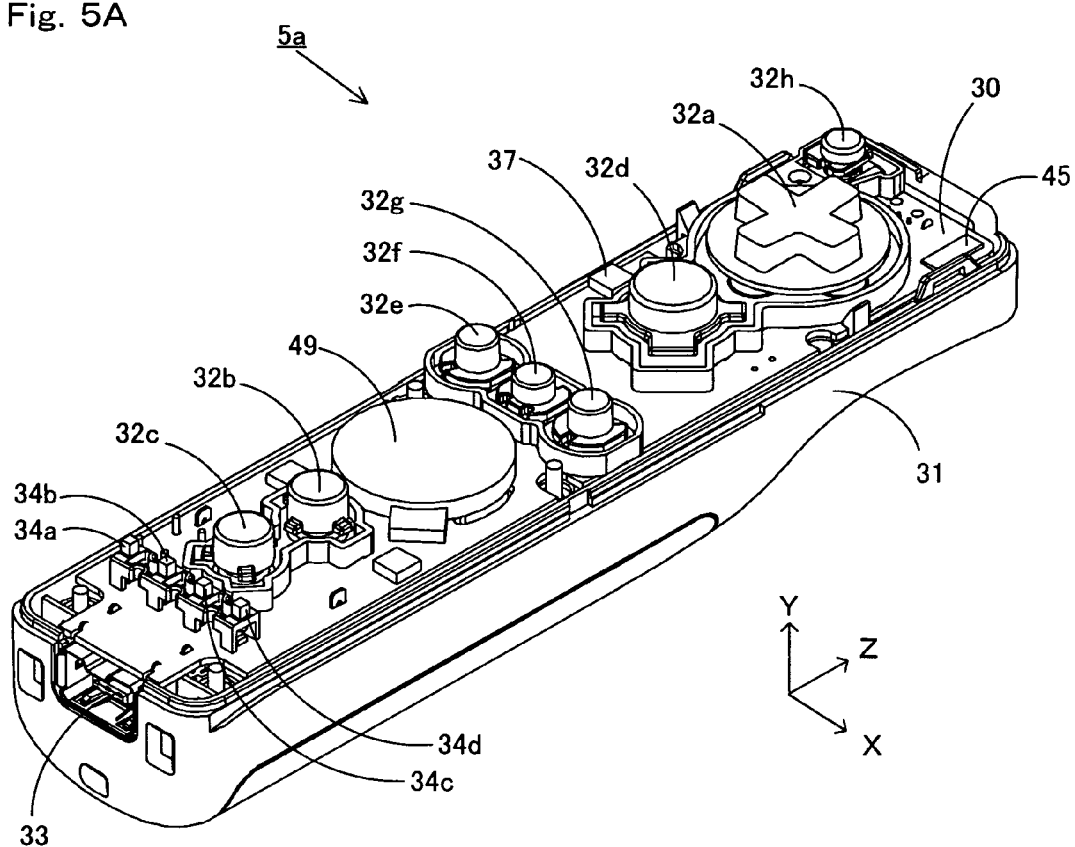
Figure 5B:
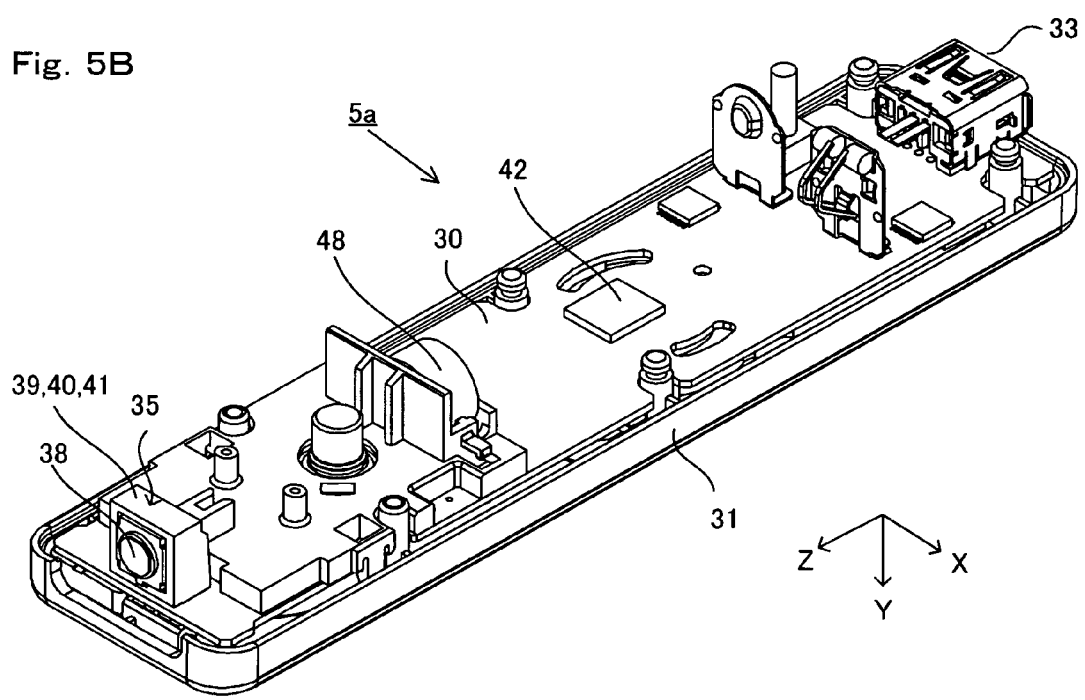

Referring now to FIGS. 5A and 5B, an internal configuration of the main controller 5a will be described. FIGS. 5A and 5B show an internal configuration of the main controller 5a. FIG. 5A is a perspective view showing the main controller 5a with an upper casing (a part of the housing 31) taken off. FIG. 5B is a perspective view showing the main controller 5a with a lower casing (a part of the housing 31) taken off. FIG. 5A shows one side of a substrate 30, and FIG. 5B shows the other side thereof.

In FIG. 5A, the substrate 30 is secured in the housing 31, and the control buttons 32a to 32h, the LEDs 34a to 34d, an acceleration sensor 37, an antenna 45, the speaker 49, etc., are provided on the upper principal plane of the substrate 30. These components are connected to a microcomputer 42 (see FIG. 5B) via lines (not shown) formed on the substrate 30, etc. In the present embodiment, the acceleration sensor 37 is located off the center of the main controller 5a with respect to the X-axis direction. Therefore, it is easier to calculate the movement of the main controller 5a when the main controller 5a is turned about the Z axis. Moreover, with a wireless module 44 (not shown) and the antenna 45, the main controller 5a can function as a wireless controller.

Referring to FIG. 5B, the image capturing/processing section 35 is provided at the front edge on the lower principal plane of the substrate 30. The image capturing/processing section 35 includes an infrared filter 38, a lens 39, an image sensing device 40 and an image processing circuit 41 provided in this order from the front side of the main controller 5a, and these components are provided on the lower principal plane of the substrate 30.

The microcomputer 42 and a vibrator 48 are provided on the lower principal plane of the substrate 30. The vibrator 48 may be, for example, a vibrating motor or a solenoid, and is connected to the microcomputer 42 via lines formed on the substrate 30, etc. As the vibrator 48 is actuated by an instruction from the microcomputer 42, the main controller 5a is vibrated, and the vibration is transmitted to the hand of the player holding the main controller 5a, thus realizing a video game with vibration feed back. In the present invention, the vibrator 48 is located slightly closer to the front side of the housing 31. As the vibrator 48 is provided closer to an edge of the main controller 5a away from the center, the entire main controller 5a can be more violently vibrated by the vibrator 48. The connector 33 is provided at the rear edge on the lower principal plane of the substrate 30. In addition to the components shown in FIGS. 5A and 5B, the main controller 5a includes a quartz oscillator for generating a basic clock for the microcomputer 42, an amplifier for outputting a sound signal to the speaker 49, etc.

Figure 6:
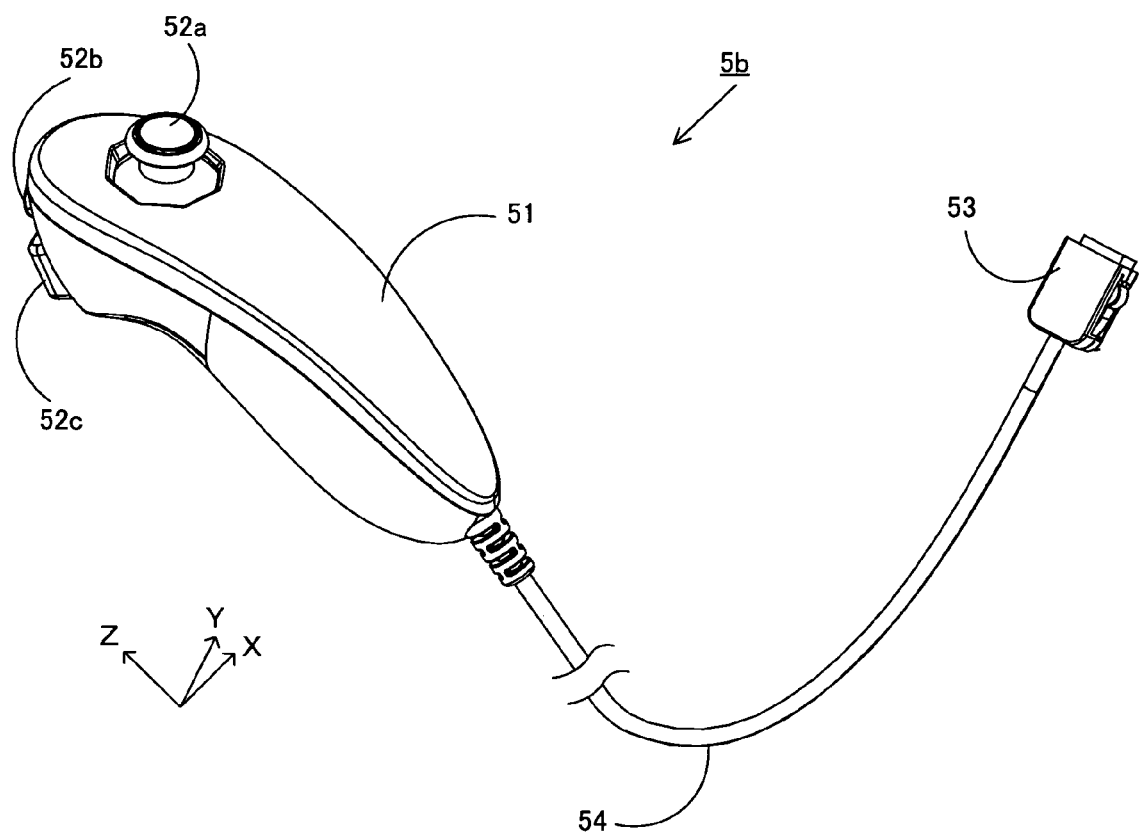
FIG. 6 is a perspective view of a sub-controller 5b.
Figure 7:
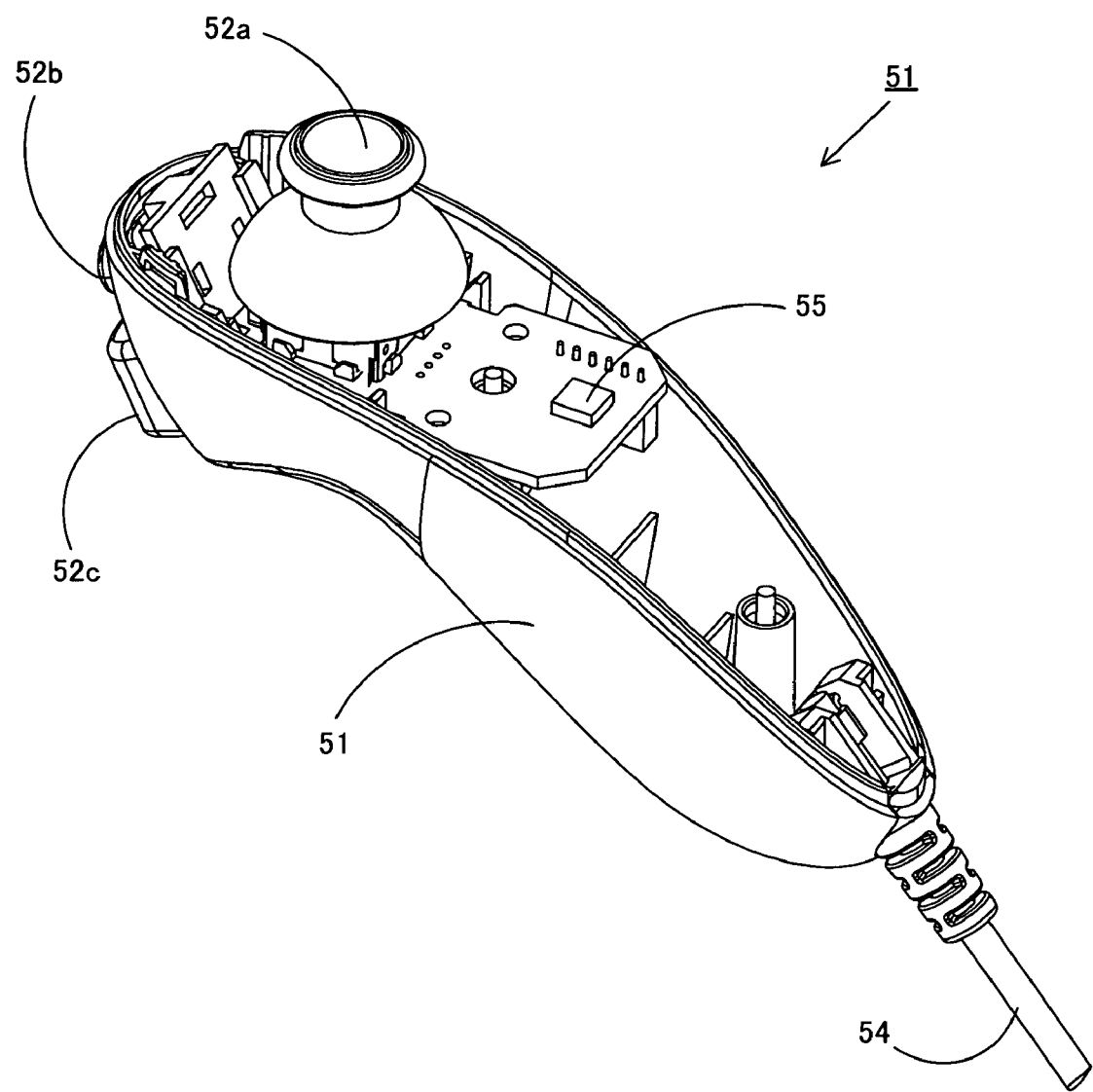
FIG. 7 is a perspective view showing the sub-controller 5b with an upper casing taken off.

Referring now to FIGS. 6 and 7, the sub-controller 5b will be described. FIG. 6 is a perspective view of the sub-controller 5b. FIG. 7 is a perspective view of the sub-controller 5b shown in FIG. 6 with an upper casing (a part of a housing 51) taken off.

Referring to FIG. 6, the sub-controller 5b includes a housing 51 formed by molding a plastic material, for example. The housing 51 has a streamlined solid shape with the thickest head portion of the sub-controller 5b being formed at the front end thereof, with the longitudinal direction being the front-rear direction (the Z-axis direction in FIG. 6), and has an overall size such that it can be held in a hand of an adult or a child. Using the sub-controller 5b, the player can perform a game operation by pressing down buttons provided on the sub-controller 5b and by moving the sub-controller 5b itself to change its position and orientation. For example, the player can control a control object by turning the sub-controller 5b.

A stick 52a is provided near the thickest portion on the upper surface of the housing 51. The stick 52a is protruding from the upper surface of the housing 51 and can be tilted by the player. When the stick 52a is tilted in a direction, an operation signal is outputted according to the tilt direction. For example, as the player specifies a certain direction or position by tilting the tip of the stick 52a in that direction (the stick 52a can be tilted in any direction), whereby the player can specify the direction in which the player character, the cursor, or the like, is to be moved in the virtual game world.

An X button 52b and a Y button 52c are provided on the front surface of the housing 51 of the sub-controller 5b. Each of these control buttons 52b and 52c is assigned a function as specified in the game program executed by the game device 3. In the exemplary arrangement shown in FIG. 6, the control buttons 52b and 52c are arranged next to each other in the up-down direction (the Y-axis direction in FIG. 6) on the front surface of the housing 51. One end of a cable 54 is connected to the rear end of the housing 51 of the sub-controller 5b. The other end of the cable 54 is connected to the connector 53. The connector 53 has such a shape that it fits in the connector 33 of the main controller 5a. As the connector 53 of the sub-controller 5b is fitted in the connector 33 of the main controller 5a, the main controller 5a and the sub-controller 5b are connected to each other.

In FIG. 7, a substrate is secured in the housing 51, and the stick 52a, an acceleration sensor 55, etc., are provided on the upper principal plane of the substrate. The stick 52a, the control buttons 52b and 52c and the acceleration sensor 55 are connected to the cable 54 via lines (not shown) formed on the substrate, etc.

The shape of the controllers 5a and 5b, the shape of the control buttons, the number and arrangement of the acceleration sensors and vibrators, etc., as shown in FIGS. 3 to 7 are all illustrative, and it is understood that the present invention can be carried out with any other suitable shape, number and arrangement. Moreover, the position of the image capturing/processing section 35 (the light receiving surface 35a of the image capturing/processing section 35) in the main controller 5a does not have to be on the front surface of the housing 31, but may be on another surface as long as light can be taken in from outside the housing 31.

Figure 8:
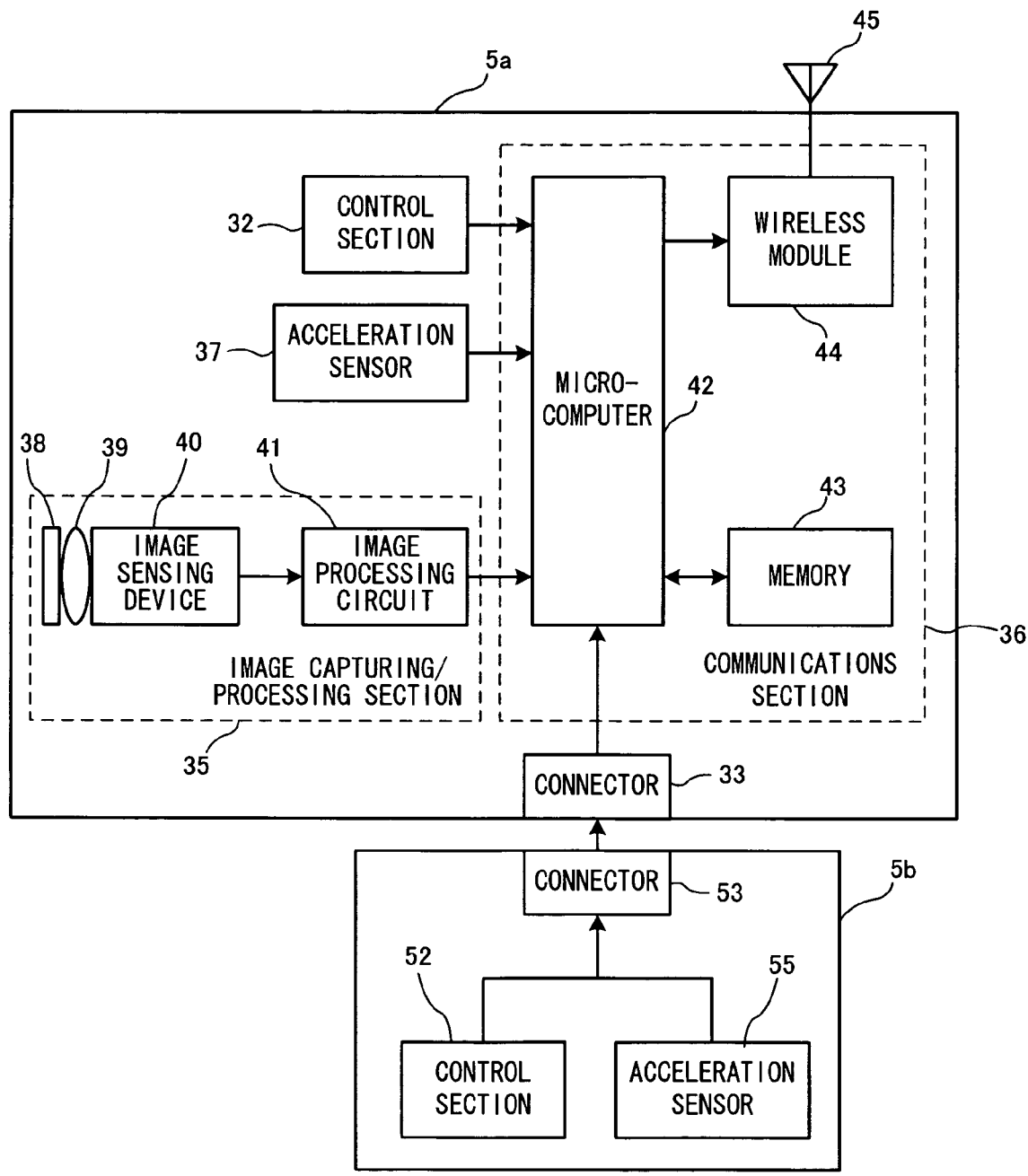
FIG. 8 is a block diagram showing a configuration of the controllers 5a and 5b.

FIG. 8 is a block diagram showing a configuration of the controllers 5a and 5b. The main controller 5a includes a control section 32 (the control buttons 32a to 32i), the connector 33, the image capturing/processing section 35, a communications section 36, and the acceleration sensor 37. The main controller 5a transmits data according to the orientation thereof as the operation data to the game device 3.

The control section 32 corresponds to the control buttons 32a to 32i described above, and outputs data representing the input state of the control buttons 32a to 32i (i.e., whether the control buttons 32a to 32i are each being pressed) to the microcomputer 42 of the communications section 36.

The acceleration sensor 37 detects the acceleration (including the gravitational acceleration) of the main controller 5a, i.e., the force (including the gravity) acting upon the main controller 5a. The acceleration sensor 37 detects the value of the acceleration along a straight line in the sensing axial direction, among other accelerations acting upon the detector section of the acceleration sensor 37. For example, with a multi-axis acceleration sensor (for two or more axes), the acceleration component (linear acceleration) along each axis is detected as the acceleration acting upon the detector section of the acceleration sensor. For example, the 3- or 2-axis acceleration sensor 37 may be of the type available from Analog Devices, Inc., or STMicroelectronics N.V.

In the present embodiment, the acceleration sensor 37 detects a linear acceleration with respect to each of the three axial directions, i.e., the up-down direction (the Y-axis direction in FIG. 3), the left-right direction (the X-axis direction in FIG. 3) and the front-rear direction (the Z-axis direction in FIG. 3) with respect to the main controller 5a. Since the acceleration sensor 37 detects a linear acceleration along each axis, the output from the acceleration sensor 37 represents the value of linear acceleration for each of three axes. Thus, the detected acceleration can be represented by a three-dimensional vector in an XYZ coordinate system defined with respect to the main controller 5a. Hereinafter, the term "acceleration vector" is used to refer to a vector whose components are the acceleration values for the three axes detected by the acceleration sensor 37.

The data (acceleration data) representing the acceleration (acceleration vector) detected by the acceleration sensor 37 is outputted to the communications section 36. In the present embodiment, the acceleration sensor 37 is used as a sensor for outputting data according to the orientation of the main controller 5a. Thus, the game device 3 calculates the orientation of the main controller 5a based on the acceleration data, and performs a game process based on the calculated orientation. The method for calculating the orientation of the main controller 5a will be described later.

The image capturing/processing section 35 is a system for analyzing image data obtained by image capturing means to determine each spot with high luminance and then to calculate the centroid, the size, etc., of the spot. The image capturing/processing section 35 has a maximum sampling frequency of about 200 frames per second, for example, and is thus capable of following fast movements of the main controller 5a.

The image capturing/processing section 35 includes the infrared filter 38, the lens 39, the image sensing device 40, and the image processing circuit 41. The infrared filter 38 passes only an infrared portion of incident light entering the main controller 5a from the front side. The lens 39 condenses the infrared light passing through the infrared filter 38, and outputs the condensed infrared light onto the image sensing device 40. The image sensing device 40 is a solid-state image sensing device, such as a CMOS sensor or a CCD sensor, for capturing the infrared light condensed through the lens 39 to output an image signal. The markers 6R and 6L of the sensor bar 6 provided around the display screen of the TV 2 are infrared LEDs outputting infrared light to the front side of the TV 2. Therefore, with the provision of the infrared filter 38, the image sensing device 40 produces image data by capturing only the infrared light that has passed through the infrared filter 38, whereby it is possible to more accurately capture the image of the markers 6R and 6L. The image obtained by the image sensing device 40 will hereinafter be referred to as the "captured image". The image data produced by the image sensing device 40 is processed in the image processing circuit 41. The image processing circuit 41 calculates the positions of the imaging targets (the markers 6R and 6L) in the captured image. The image processing circuit 41 outputs coordinates representing the calculated position to the microcomputer 42 of the communications section 36. The coordinate data is transmitted by the microcomputer 42 to the game device 3 as the first operation data. The coordinates are referred to as the "marker coordinates". Since the marker coordinates vary according to the direction (orientation) and position of the main controller 5a, the game device 3 can calculate the direction where the main controller 5a is pointing based on the marker coordinates.

In the present embodiment, the marker coordinate data does not need to be used in the game process. Therefore, the main controller 5a may not be provided with the image capturing/processing section 35. In such a case, the sensor bar 6 is unnecessary.

The sub-controller 5b includes a control section 52 (the stick 52a and the control buttons 52b and 52c) and the acceleration sensor 55. The sub-controller 5b transmits data according to the orientation thereof to the game device 3 as the operation data.

The control section 52 of the sub-controller 5b corresponds to the stick 52a and the control buttons 52b and 52c described above. The control section 52 outputs data representing the input state thereof to the microcomputer 42 of the communications section 36 via the connectors 53 and 33. The input state of the control section 52 is, for example, the angle and the direction of the tilting of the stick 52a, whether the control buttons 52b and 52c are being pressed down, etc.

As does the acceleration sensor 37 of the main controller 5a, the acceleration sensor 55 detects the acceleration (including the gravitational acceleration) of the sub-controller 5b. In the present embodiment, the acceleration sensor 55 detects the linear acceleration for each of the three axial directions, i.e., the up-down direction (the Y-axis direction in FIG. 6), the left-right direction (the X-axis direction in FIG. 6) and the front-rear direction (the Z-axis direction in FIG. 6) with respect to the sub-controller 5b. The acceleration sensor 55 may be the same sensor as the acceleration sensor 37 of the main controller 5a. The acceleration sensor 55 outputs the acceleration data to the microcomputer 42 of the communications section 36 via the connectors 53 and 33. The acceleration sensor 55 is used as a sensor outputting data according to the orientation of the sub-controller 5b. Specifically, the game device 3 calculates the orientation of the sub-controller 5b based on the acceleration data, and performs a game process based on the calculated orientation.

As described above, the sub-controller 5b transmits the data representing the input state of the control section 52 and the acceleration data from the acceleration sensor 55 to the communications section 36 of the main controller 5a as the second operation data.

The communications section 36 includes the microcomputer 42, a memory 43, the wireless module 44, and the antenna 45. While using the memory 43 as a storage area when performing a process, the microcomputer 42 controls the wireless module 44, which wirelessly transmits data obtained by the microcomputer 42 to the game device 3.

The data outputted from the control section 32, the image capturing/processing section 35, and the acceleration sensor 37 to the microcomputer 42 are temporarily stored in the memory 43. These data are transmitted to the game device 3 as the first operation data. The second operation data transmitted from the sub-controller 5b is temporarily stored in the memory 43. At the transmission timing for transmitting data to the communications unit 16 of the game device 3, the microcomputer 42 outputs the first and second operation data stored in the memory 43 to the wireless module 44. The wireless module 44 uses a technique such as Bluetooth (registered trademark) to modulate a carrier of a predetermined frequency with the operation data, and radiates the weak radio wave signal from the antenna 45. Thus, each control data is modulated by the wireless module 44 into a weak radio wave signal and transmitted from the main controller 5a. The weak radio wave signal is received by the communications unit 16 of the game device 3. The game device 3 can obtain the first and second operation data by demodulating and decoding the received weak radio wave signal. The CPU 10 of the game device 3 performs the game process based on the obtained operation data and the game program. Data are wirelessly transmitted from the communications section 36 to the communications unit 16 at regular intervals. Since the game process typically proceeds in a cycle of 1/60 second (being one frame), the interval is preferably less than or equal to 1/60 second. The communications section 36 of the main controller 5a outputs the operation data to the communications unit 16 of the game device 3 once in 0.5 ms, for example.

By using the two controllers 5a and 5b, the player can perform game operations such as changing the orientation of the controllers 5a and 5b and moving the controllers 5a and 5b, in addition to the conventional game operation of pressing control buttons.

Figure 9:
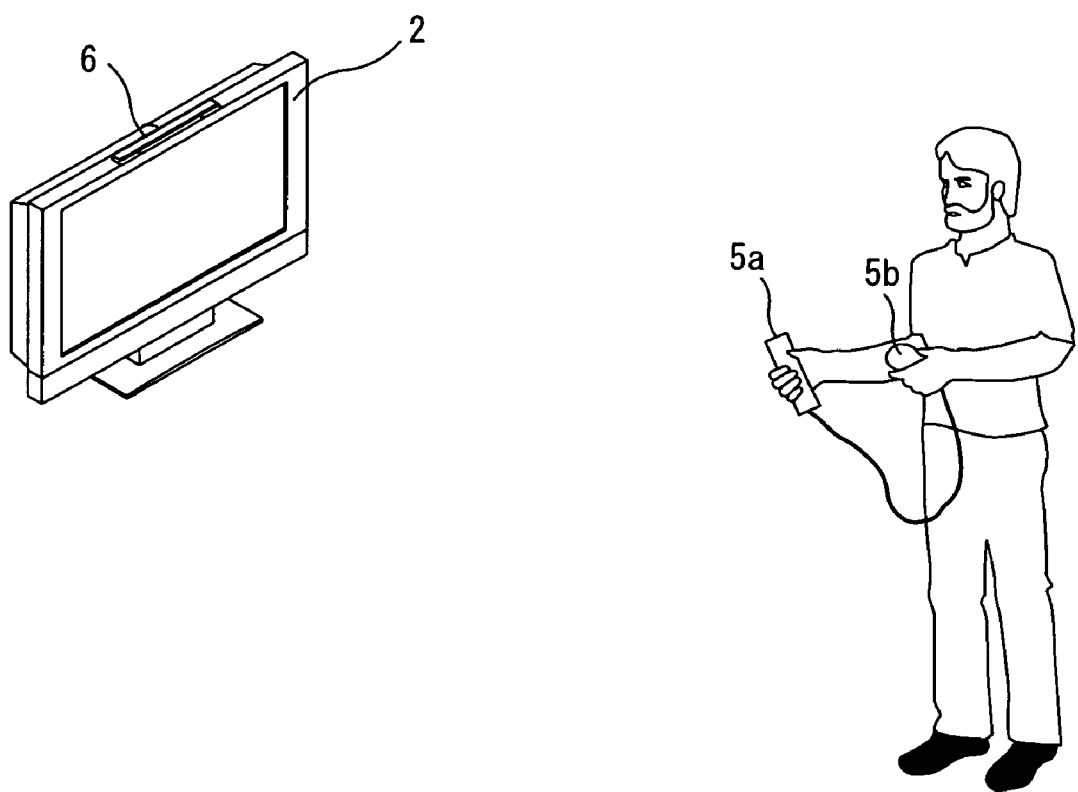
FIG. 9 shows how the player performs a game operation using the two controllers 5a and 5b.

FIG. 9 shows how the game is played using the two controllers 5a and 5b. Where a game is played on the game system 1 using the two controllers 5a and 5b, the player holds the main controller 5a in one hand and the sub-controller 5b in the other hand, as shown in FIG. 9. In the present embodiment, the player performs game operations by tilting the controllers 5a and 5b. The details of the game operations will be described later.

(Method for Calculating Orientation)

Figure 10:
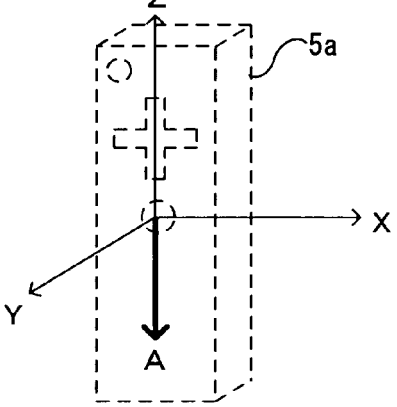
FIG. 10 shows different positions of the main controller 5a and corresponding acceleration vectors to be detected.
Figure 10:
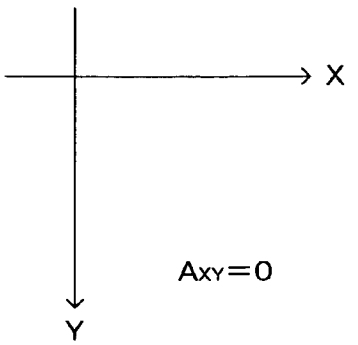
Figure 10:
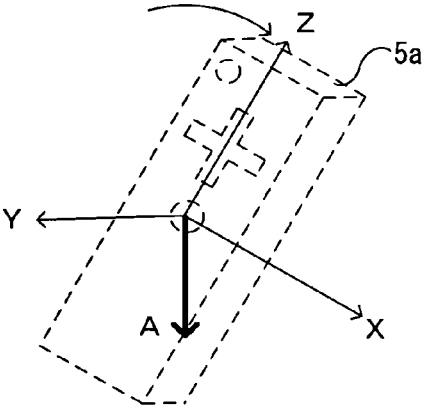
Figure 10:
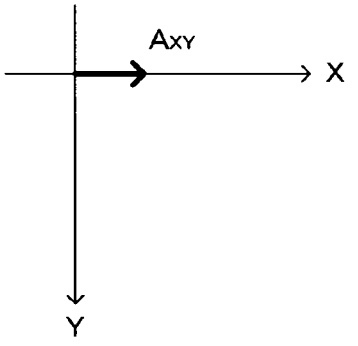
Figure 10:
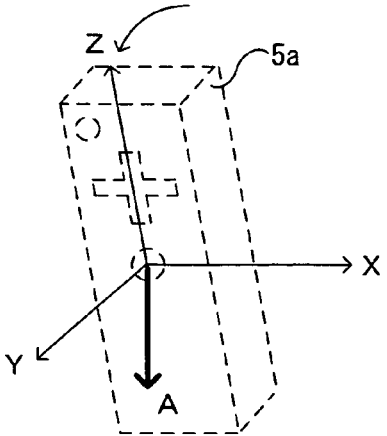
Figure 10:
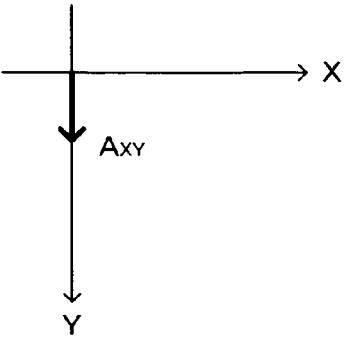

Referring now to FIG. 10, a method for calculating the inclination of the controller will be described. FIG. 10 shows different positions (orientations) of the main controller 5a and corresponding acceleration vectors to be detected. In FIG. 10, it is assumed that the main controller 5a is stationary. The position A shown in FIG. 10 is a position where the upper surface of the main controller 5a is facing opposite to the direction of gravity, i.e., a position where the Z axis in the XYZ coordinate system defined with respect to the main controller 5a extends in the opposite direction to the direction of gravity. The position A will hereinafter be referred to as the reference position. In the present embodiment, the player performs a game operation by tilting the main controller 5a to turn it about the X axis or the Y axis. Thus, in the present embodiment, the game device 3 calculates the orientation of the controller with respect to the turning thereof about the X axis or the Y axis.

In the position A, where only the gravity is acting upon the main controller 5a, the acceleration sensor 37 detects, as the acceleration vector, a three-dimensional vector A facing in the direction of gravity as shown in FIG. 10. In the position A, the vector A is parallel to the Z axis. In the present embodiment, the magnitude of the vector A is represented as being "1". In the position A, the two-dimensional vector $A_{XY}$ made of the X and Y components of the acceleration vector A is $A_{XY}=0$. Thus, when $A_{XY}=0$, it is possible to determine that the main controller 5a is in the reference position.

The position B shown in FIG. 10 is a position where the main controller 5a has been turned about the Y axis from the reference position. In the position B, the acceleration vector A is inclined toward the X axis from the direction parallel to the Z axis. Then, the two-dimensional vector $A_{XY}$ is such that the X component value is not zero and the Y component value is zero. Thus, the X component value of the acceleration vector varies depending on the orientation of the main controller 5a about the Y axis (the orientation of the main controller 5a with respect to the turning thereof about the Y axis). Where the orientation of the main controller 5a about the Y axis is changed from −90° to 90° with the reference position being 0°, the X component value gradually increases from −1 to 1. For example, the X component value is "−1" in a position where the main controller 5a is inclined by −90° about the Y axis, "−√2/2 (≈−0.71)" in a position where the main controller 5a is inclined by −45° about the Y axis, and "1" in a position where the main controller 5a is inclined by 90° about the Y axis. In the angle representation, a positive value and a negative value represent a clockwise turning and a counterclockwise turning, respectively, as viewed in the Y axis negative direction. As described above, it is possible to determine the orientation of the main controller 5a about the Y axis based on the X component value of the acceleration vector.

The position C shown in FIG. 10 is a position where the main controller 5a has been turned about the X axis from the reference position. In the position C, the acceleration vector A is inclined toward the Y axis from the direction parallel to the Z axis. Then, the two-dimensional vector $A_{XY}$ is such that the Y component value is not zero and the X component is zero. Thus, the Y component value of the acceleration vector varies depending on the orientation of the main controller 5a about the X axis (the orientation of the main controller 5a with respect to the turning thereof about the X axis). Where the orientation of the main controller 5a about the X axis is changed from −90° to 90° with the reference position being 0°, the Y component value gradually increases from −1 to 1. In the angle representation, a positive value and a negative value represent a clockwise turning and a counterclockwise turning, respectively, as viewed in the X axis positive direction. As described above, it is possible to determine the orientation of the main controller 5a about the X axis based on the Y component value of the acceleration vector.

As described above, in the present embodiment, the game device 3 uses the X component value of the acceleration vector detected by the acceleration sensor 37 as a value representing the orientation of the main controller 5a about the Y axis. Moreover, the game device 3 uses the Y component value of the acceleration vector detected by the acceleration sensor 37 as a value representing the orientation of the main controller 5a about the X axis.

While the calculation of the orientation of the main controller 5a is illustrated in FIG. 10, the orientation of the sub-controller 5b can be calculated similarly. Specifically, the game device 3 can calculate the orientation of the sub-controller 5b about the X axis and that about the Y axis based on the acceleration vector detected by the acceleration sensor 55 of the sub-controller 5b.

Although a capacitance-coupling acceleration sensor is used for calculating the orientation of the controller in the present embodiment, other types of acceleration sensors and gyrosensors may be used. While an acceleration sensor detects the linear acceleration along each axis, a gyrosensor detects an angular velocity entailing rotation. Therefore, a gyrosensor and an acceleration sensor cannot simply be replaced by each other as they detect signals of different natures. In order to calculate the orientation using a gyrosensor instead of an acceleration sensor, substantial changes need to be made. Specifically, the value of the orientation is initialized at the beginning of the detection. Then, the angular velocity data outputted from the gyroscope are integrated together. Then, by using the result of integration, the amount of change in the orientation with respect to the initial value is calculated. The calculated orientation is represented in angle.

As already described above, where the orientation is calculated by an acceleration sensor, the orientation is calculated based on an acceleration vector. Therefore, the calculated orientation can be represented by a vector, and an absolute direction can be detected without initialization. This is a difference between an acceleration sensor and a gyroscope. Moreover, they calculate the orientation in values of different natures, i.e., one being an angle and the other being a vector. Therefore, when an acceleration sensor is replaced by a gyroscope, it is necessary to perform a predetermined conversion on the orientation data.

(Summary of Game)

Figure 11:
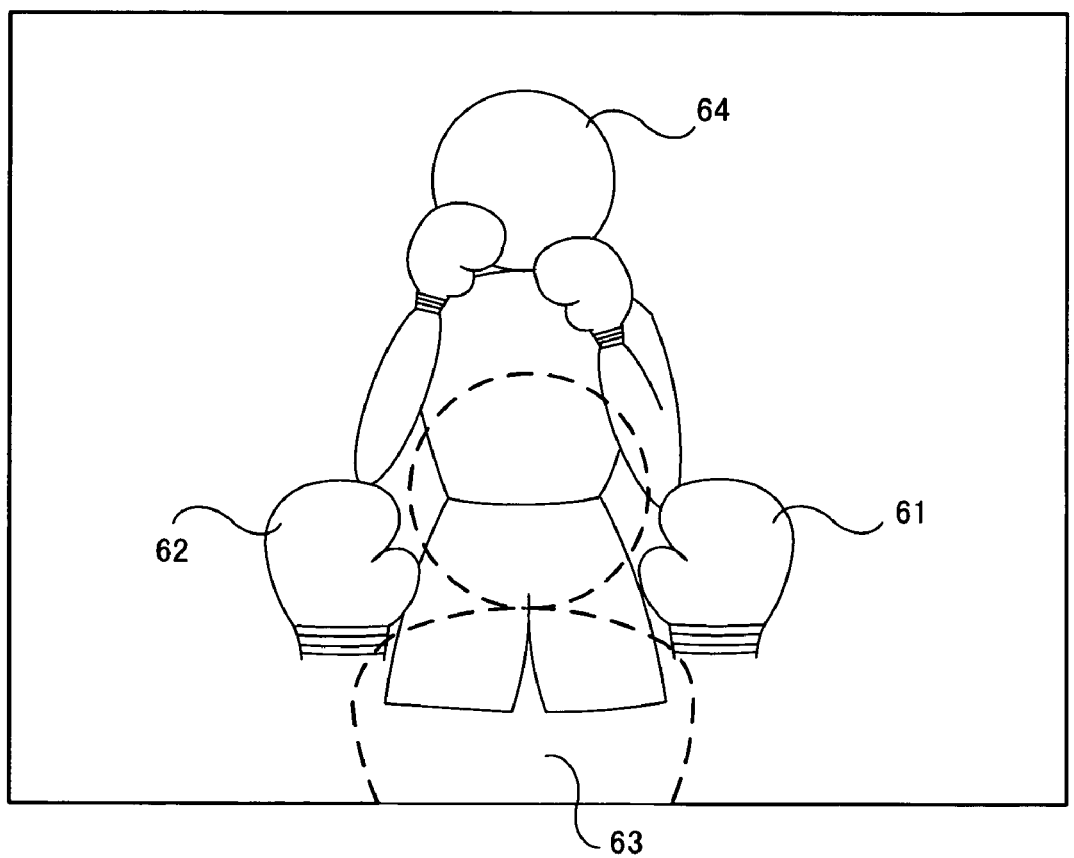
FIG. 11 shows an example of a game screen displayed on a TV 2 in the game of the present invention.

Referring now to FIGS. 11 to 14, the game to be played with the game device 3 and the game operations will be described. FIG. 11 shows an example of a game screen displayed on the TV 2 in this game. As shown in FIG. 11, this game is a boxing game, where a right hand object 61, a left hand object 62, a torso object 63, and an enemy object 64 are displayed on the screen. In this game, the player controls a player object including the right hand object 61, the left hand object 62 and the torso object 63 to box with the enemy object 64. In the present embodiment, the torso object 63 is translucent (the torso object 63 is drawn with dotted lines in FIG. 11) so that the player can better see the enemy object 64.

In this game, there are three objects to be controlled by the player, i.e., the right hand object 61, the left hand object 62 and the torso object 63. The player uses the controllers 5a and 5b to perform a first operation of controlling the position and orientation of the right hand object 61, a second operation of controlling those of the left hand object 62, and a third operation of controlling the position of the torso object 63. Moreover, in the present embodiment, the player can make the player object throw a punch with the right hand object 61 using the main controller 5a, or make the player object throw a punch with the left hand object 62 using the sub-controller 5b.

In this game, the player is supposed to hold each controller so that the Z axis of the controller is facing opposite to the direction of gravity (the reference position) with the upper surface of the controller facing toward the player. In such a position, the operation of turning the controller about the Y axis (the position B shown in FIG. 10) is an operation of tilting the controller left or right as viewed from the player. Therefore, the operation of turning the controller about the Y axis will hereinafter be referred to as the "left-right turning operation". Moreover, the operation of turning the controller about the X axis (the position C shown in FIG. 10) is an operation of tilting the controller forward or backward as viewed from the player. Therefore, the operation of turning the controller about the X axis will hereinafter be referred to as the "front-rear turning operation".

Figure 12:
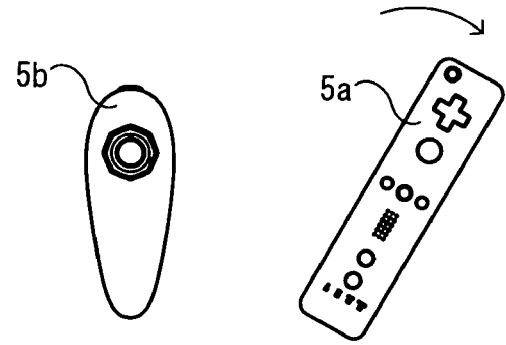
FIG. 12 shows different game operations to be performed in one embodiment of the present invention.
Figure 12:
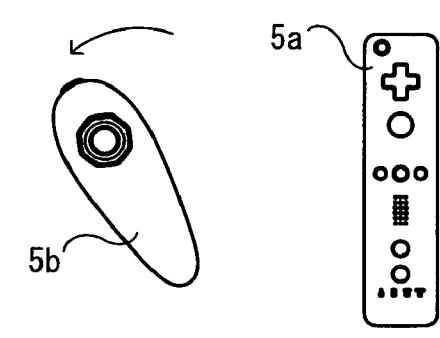
Figure 12:
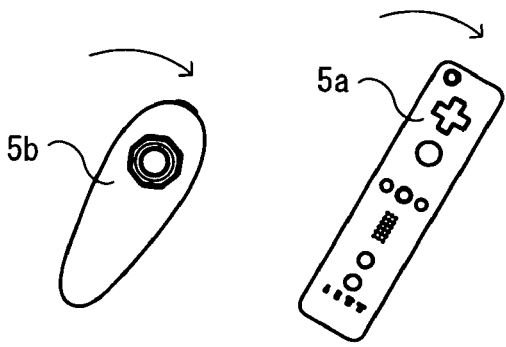

FIG. 12 shows different game operations to be performed in the present embodiment. In the present embodiment, when the player is holding each controller in the reference position, the right hand object 61 and the left hand object 62 are placed in their reference positions shown in FIG. 11.

Figure 13:
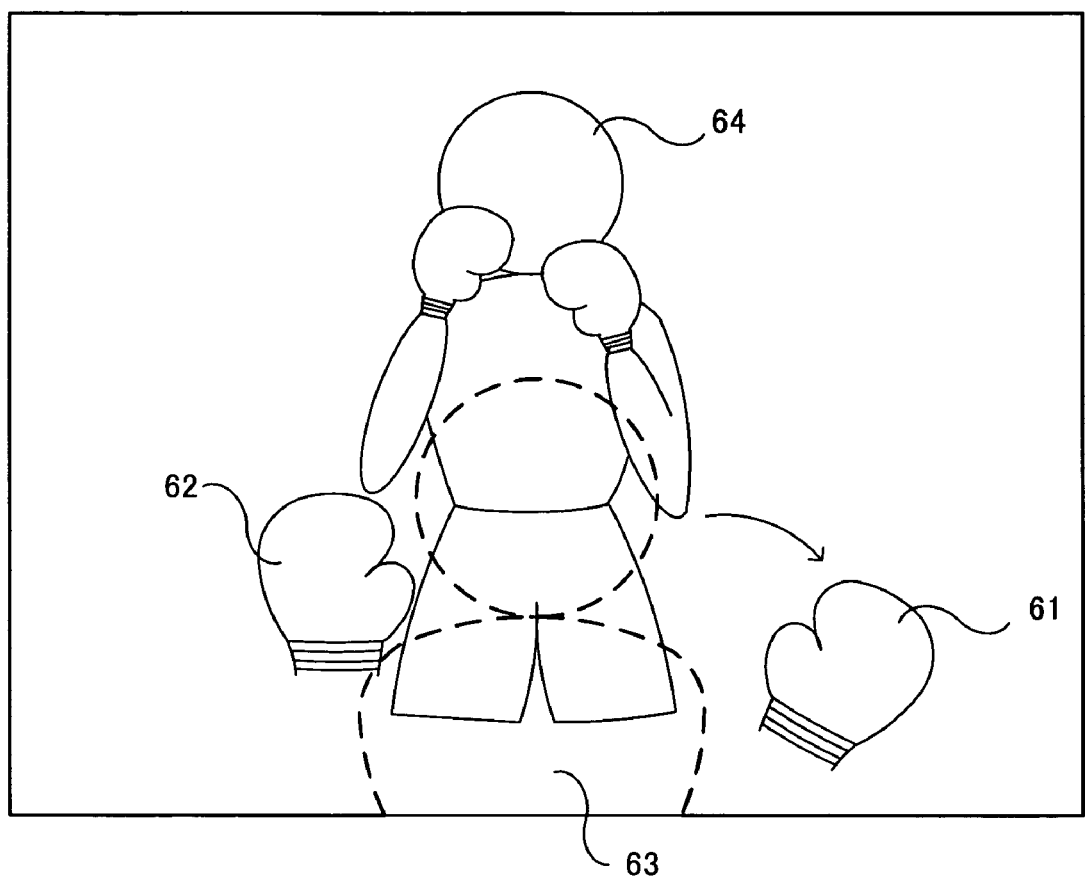
FIG. 13 shows an example of a game screen when the player performs a first operation.

Referring to FIG. 12, the first operation is an operation of performing the left-right turning operation and/or the front-rear turning operation on the main controller 5a (FIG. 12 shows a case where the player performs the left-right turning operation). According to the first operation, the game device 3 controls the position and orientation of the right hand object 61. FIG. 13 shows an example of a game screen when the player performs the first operation. When the player performs the left-right turning operation on the main controller 5a, the right hand object 61 turns about an axis extending in the depth direction of the screen (FIG. 13). In other words, the right hand object 61 turns clockwise or counterclockwise with respect to the screen. As a result of the turning, the orientation and position of the right hand object 61 change. When the player performs the front-rear turning operation on the main controller 5a, the right hand object 61 turns about an axis extending in the left-right direction of the screen. In other words, the right hand object 61 moves while turning in the front-rear direction of the screen. The right hand object 61 changes the orientation and position thereof by an angle corresponding to the angle by which the main controller 5a is inclined from the reference position.

The second operation is an operation of performing the left-right turning operation and/or the front-rear turning operation on the sub-controller 5b (FIG. 12 shows a case where the player performs the left-right turning operation). According to the second operation, the game device 3 controls the position and orientation of the left hand object 62. The left hand object 62 is controlled in a similar manner to that for the right hand object 61. Specifically, when the player performs the left-right turning operation on the sub-controller 5b, the left hand object 62 turns about an axis extending in the depth direction of the screen. When the player performs the front-rear turning operation on the sub-controller 5b, the left hand object 62 turns about an axis extending in the left-right direction of the screen. The left hand object 62 changes the orientation and position thereof by an angle corresponding to the angle by which the sub-controller 5b is inclined from the reference position.

Figure 14:
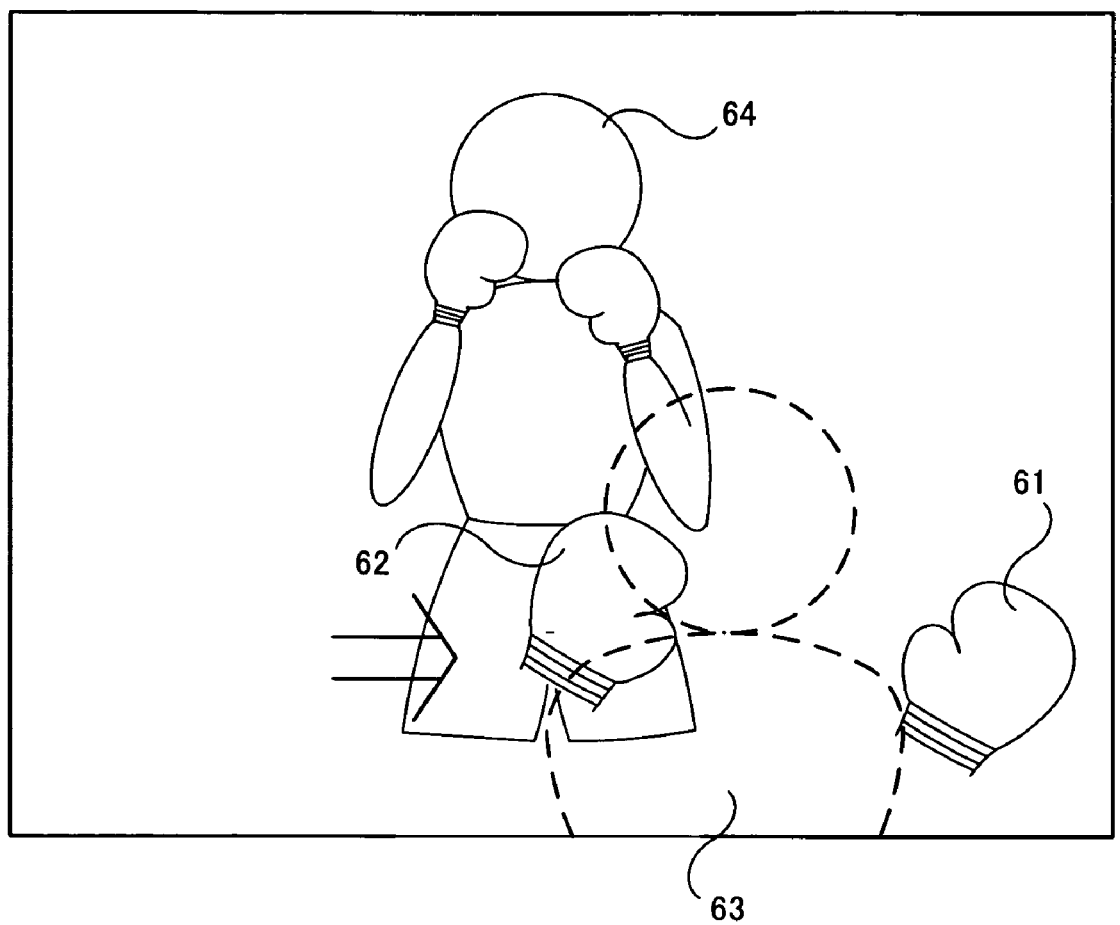
FIG. 14 shows an example of a game screen when the player performs a third operation.

The third operation is an operation of performing the left-right turning operation and/or the front-rear turning operation on both the main controller 5a and the sub-controller 5b (FIG. 12 shows a case where the player performs the left-right turning operation). According to the third operation, the game device 3 controls the position of the torso object 63. FIG. 14 shows an example of a game screen when the player performs the third operation. When the player performs the left-right turning operation on the main controller 5a and the sub-controller 5b, the torso object 63 moves in the left-right direction of the screen as shown in FIG. 14. When the player performs the front-rear turning operation on the main controller 5a and the sub-controller 5b, the torso object 63 moves in the front-rear direction of the screen. When the third operation is performed, the orientation of the controllers 5a and 5b changes, whereby the position and orientation of the right hand object 61 and the left hand object 62 also change as shown in FIG. 14.

With the third operation, the control method used when the left-right turning operation is performed on the two controllers 5a and 5b is different from that used when the front-rear turning operation is performed, the details of which will be described later. Specifically, when the left-right turning operation is performed, the game device 3 calculates the degree of similarity between the orientation of the controller 5a and that of the controller 5b. Then, the game device 3 controls the position of the torso object 63 so that the amount of movement of the torso object 63 varies according to the degree of similarity. When the front-rear turning operation is performed, the game device 3 does not calculate the degree of similarity.

As is apparent from the fact that the degree of similarity is calculated with the left-right turning operation, the player is required to operate the two controllers 5a and 5b similarly to some extent in a left-right turning operation. With the front-rear turning operation, the player is not required to operate the two controllers 5a and 5b similarly. The third operation does not require the player to operate the main controller 5a and the sub-controller 5b in exactly the same manner. Therefore, even when the first operation or the second operation is performed, it may be determined that the third operation is performed, whereby the torso object 63 is moved.

As described above, in the game of the present embodiment, the right hand object 61 can be controlled through the first operation of moving the main controller 5a, the left hand object 62 can be controlled through the second operation of moving the sub-controller 5b, and the torso object 63 can be controlled through the third operation of moving the main controller 5a and the sub-controller 5b. Thus, with the present embodiment, three objects can be controlled with a simple configuration using only two input devices. Moreover, the present embodiment realizes a game operation that is performed by moving two input devices in a coordinated manner, as in the third operation.

(Details of Game Process)

Figure 15:
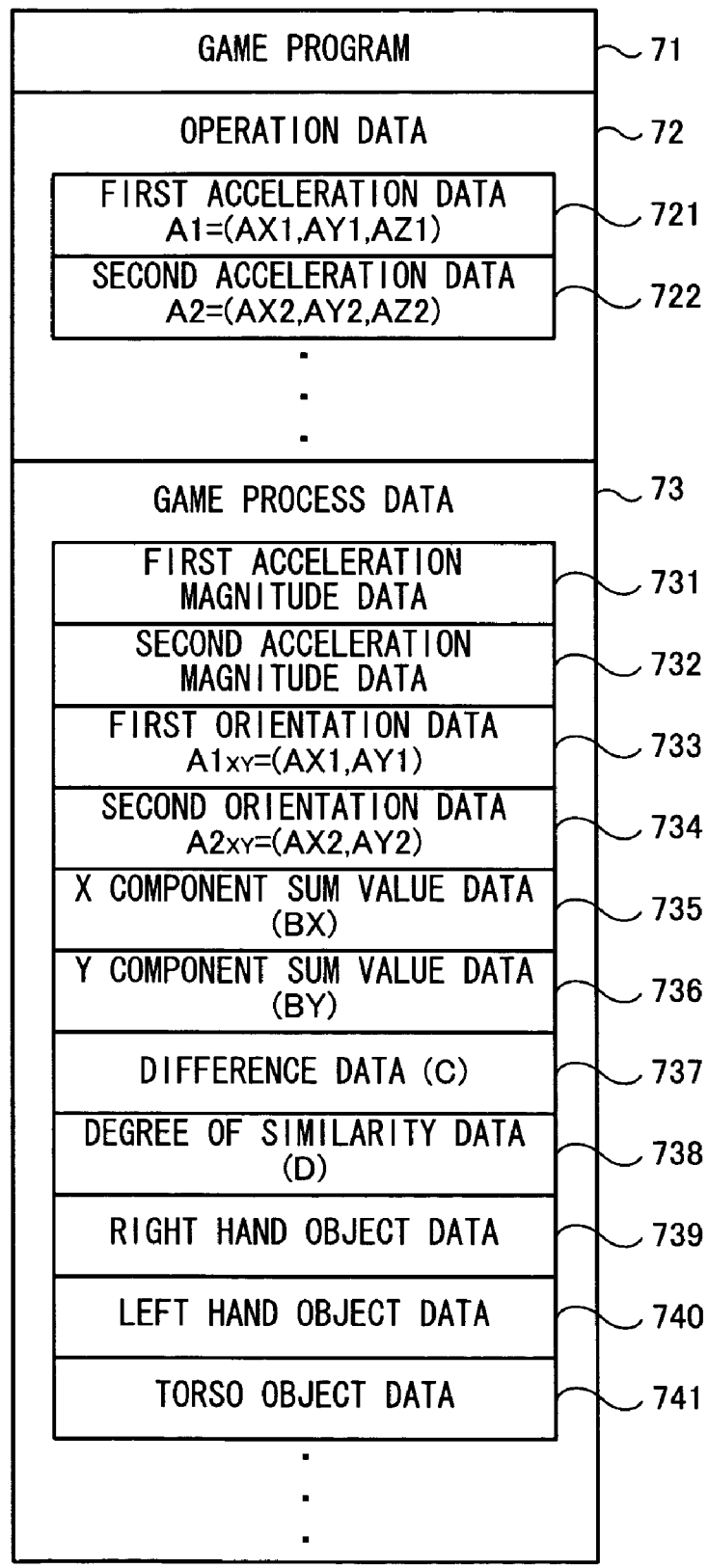
FIG. 15 shows important data to be stored in a main memory 13 of the game device 3.

The game process to be performed by the game device 3 in the present embodiment will now be described. First, important data to be used in the game process will be described with reference to FIG. 15. FIG. 15 shows important data to be stored in the main memory 13 of the game device 3. Referring to FIG. 15, the main memory 13 stores a game program 71, operation data 72, game process data 73, etc. In addition to those shown in FIG. 15, the main memory 13 also stores other data necessary for the game process, such as image data of various objects to be in the game, and data representing various parameters of the objects.

At an appropriate point in time after the power of the game device 3 is turned ON, part or whole of the game program 71 is loaded from the optical disc 4 and stored in the main memory 13. The game program 71 includes a program needed for performing the game process for controlling the objects 61 to 63 according to the orientation of the controllers 5a and 5b.

The operation data 72 is first and second operation data transmitted from the main controller 5a to the game device 3. The operation data 72 includes first acceleration data 721 and second acceleration data 722. The first acceleration data 721 is data representing the acceleration detected by the acceleration sensor 37. The first acceleration data 721 is data representing a first acceleration vector A1=(AX1, AY1, AZ1) with respect to the three (X, Y and Z) axial directions shown in FIG. 3. The second acceleration data 722 is data representing the acceleration detected by the acceleration sensor 55. The second acceleration data 722 is data representing a second acceleration vector A2=(AX2, AY2, AZ2) with respect to the three (X, Y and Z) axial directions shown in FIG. 6.

The game process data 73 includes first acceleration magnitude data 731, second acceleration magnitude data 732, first orientation data 733, second orientation data 734, X component sum value data 735, Y component sum value data 736, difference data 737, degree of similarity data 738, right hand object data 739, left hand object data 740, and torso object data 741.

The first acceleration magnitude data 731 represents the magnitude (absolute value) of the first acceleration vector A1. The second acceleration magnitude data 732 represents the magnitude (absolute value) of the second acceleration vector A2. The acceleration magnitude data 731 and 732 are used to determine whether a punch action should be activated and whether the objects 61 to 63 should be moved, the details of which will be described later.

The first orientation data 733 is data representing the orientation of the main controller 5a. In the present embodiment, the first orientation data 733 is data representing the orientation of the main controller 5a with respect to the turning thereof about the X axis and the Y axis. As shown in FIG. 10, the orientation of a controller with respect to the turning thereof about the X axis and the Y axis is represented by the X component and the Y component of the acceleration vector. Therefore, in the present embodiment, the first orientation data 733 represents the two-dimensional vector $A1_{XY}=(AX1, AY1)$ made of the X component and the Y component of the first acceleration vector A1.

The second orientation data 734 is data representing the orientation of the sub-controller 5b. In the present embodiment, the second orientation data 734 is data representing the orientation of the sub-controller 5b with respect to the turning thereof about the X axis and the Y axis. Therefore, in the present embodiment, the second orientation data 734 represents the two-dimensional vector $A2_{XY}=(AX2, AY2)$ made of the X component and the Y component of the second acceleration vector A2.

The X component sum value data 735 represents the sum value B (=AX1+AX2) obtained by adding together the X components of the two two-dimensional vectors represented by the first orientation data 733 and the second orientation data 734. The sum value represents the sum of the degree of inclination of the main controller 5a with respect to the reference position and that of the sub-controller 5b. The X component sum value data 735 is used to calculate the amount by which the torso object 63 is moved in the left-right direction.

The Y component sum value data 736 represents the sum value C (=AY1+AY2) obtained by adding together the Y components of the two two-dimensional vectors represented by the first orientation data 733 and the second orientation data 734. The Y component sum value data 736 is used to calculate the amount by which the torso object 63 is moved in the front-rear direction.

The difference data 737 represents the difference C (=|AX2|−|AX1|) between absolute values of the X components of the two two-dimensional vectors represented by the first and second orientation data 733 and 734. The difference data 737 is used to calculate the degree of similarity to be described later.

The degree of similarity data 738 represents the degree of similarity between the orientation of the main controller 5a and the orientation of the sub-controller 5b. In the present embodiment, the degree of similarity D is calculated as D=1−|C|.

The right hand object data 739 is data representing the position and orientation of the right hand object 61 in the game space. The left hand object data 740 is data representing the position and orientation of the left hand object 62 in the game space. The torso object data 741 is data representing the position of the torso object 63 in the game space.

Figure 16:
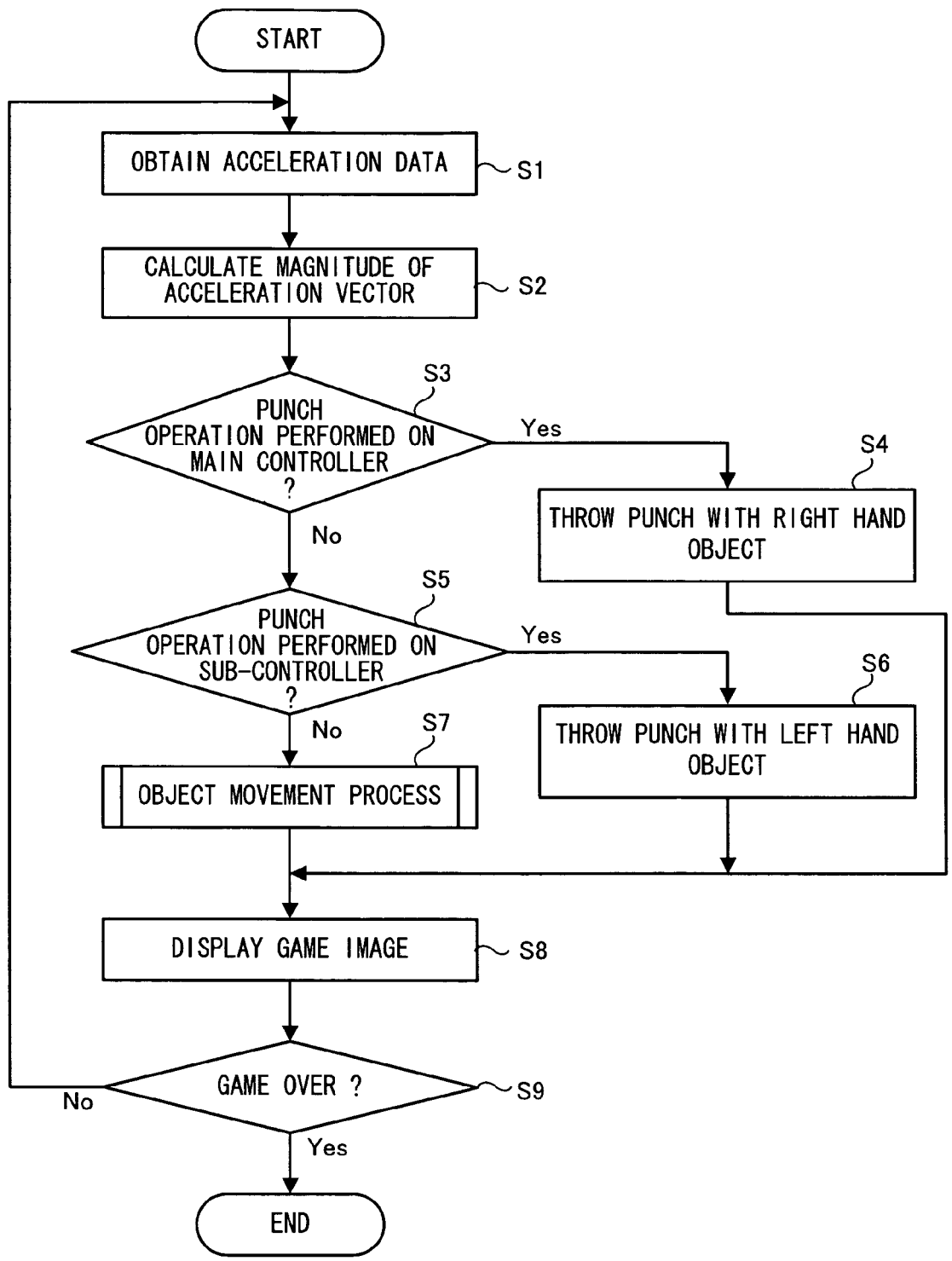
FIG. 16 is a main flow chart showing the flow of the process performed by the game device 3.

Referring now to FIGS. 16 to 19, the details of the process performed by the game device 3 will be described. FIG. 16 is a main flow chart showing the flow of the process performed by the game device 3. When the power of the game device 3 is turned ON, the CPU 10 of the game device 3 executes a boot program stored in a boot ROM (not shown), thus initializing various units such as the main memory 13. The game program stored in the optical disc 4 is loaded to the main memory 13, and the CPU 10 starts executing the game program. The flow chart of FIG. 16 shows the process performed after the completion of the process described above.

First in step S1 of the game process shown in FIG. 16, the CPU 10 obtains first and second acceleration data. Specifically, the communications unit 16 receives the first and second operation data transmitted from the main controller 5a, and the acceleration data contained in each operation data is stored in the main memory 13. The acceleration data is obtained each time step S1 is performed, and only the latest (lastly-obtained) first and second acceleration data are stored in the main memory 13.

Then, in step S2, the CPU 10 calculates the magnitudes (absolute values) of the first and second acceleration vectors. Specifically, the CPU 10 calculates the absolute value of the first acceleration vector A1 represented by the first acceleration data 721 stored in the main memory 13, and data representing the calculated absolute value is stored in the main memory 13 as the first acceleration magnitude data 731. Moreover, the absolute value of the second acceleration vector A2 represented by the second acceleration data 722 stored in the main memory 13 is calculated, and data representing the calculated absolute value is stored in the main memory 13 as the second acceleration magnitude data 732.

Then, in step S3, the CPU 10 determines whether a punch operation is performed with the main controller 5a. In the present embodiment, a punch operation is defined as an operation of rapidly moving the controller. Therefore, the determination of step S3 can be made based on whether the main controller 5a is moved rapidly. If the main controller 5a is moved rapidly, an inertial force is applied to the acceleration sensor 37 of the main controller 5a, whereby the magnitude of the acceleration vector detected by the acceleration sensor 37 is greater than a predetermined value. Thus, it is possible to determine whether a punch operation is performed based on the magnitude of the acceleration vector. Therefore, the determination of step S3 is made based on the first acceleration magnitude data 731. Specifically, it is determined that a punch operation is performed when the value represented by the first acceleration magnitude data 731 is greater than a predetermined value. It is determined a punch operation has not been performed when the value represented by the first acceleration magnitude data 731 is less than or equal to the predetermined value. If the determination result of step S3 is true, the process proceeds to step S4. If the determination result of step S3 is false, the process proceeds to step S5.

Whether the main controller 5a is moved rapidly can also be determined based on whether the magnitude of the acceleration vector is changing rapidly. Therefore, in other embodiments, the amount of change in the magnitude of the acceleration vector may be calculated, which being greater than a predetermined amount means that a punch operation is performed, and vice versa.

While the determination of step S3 is made based on the magnitude of the three-dimensional acceleration vector A1 in the present embodiment, the determination of step S3 may be made based on the magnitude of a vector representing one or two of the components of the acceleration vector A1.

In step S4, the CPU 10 makes the player object throw a punch with the right hand object 61. Therefore, the right hand object 61 moves toward, and then back from, the enemy object 64 by a predetermined distance. The CPU 10 displays, on the TV 2, the punch action in an animation representation of a plurality of frames. When a punch is thrown, the CPU 10 performs the process of determining whether the right hand object 61 has hit the enemy object 64, and if so, the process of calculating the resulting amount of damage on the enemy object 64. These processes can be realized in a manner similar to that of conventional boxing games, and will not be further described below. Step S4 is followed by step S8.

In step S5, the CPU 10 determines whether a punch operation is performed with the sub-controller 5b. The determination of step S5 can be made in a manner similar to that for step S3 as described above. Step S5, being a process for the sub-controller 5b, is performed as described above for step S3, except that the second acceleration magnitude data 732 is used instead of the first acceleration magnitude data 731. If the determination result of step S5 is true, the process proceeds to step S6. If the determination result of step S5 is false, the process proceeds to step S7.

In step S6, the CPU 10 makes the player object throw a punch with the left hand object 62. Step S6 is similar to step S4 except that the left hand object 62 is moved instead of the right hand object 61. Step S6 is followed by step S8.

Figure 17:
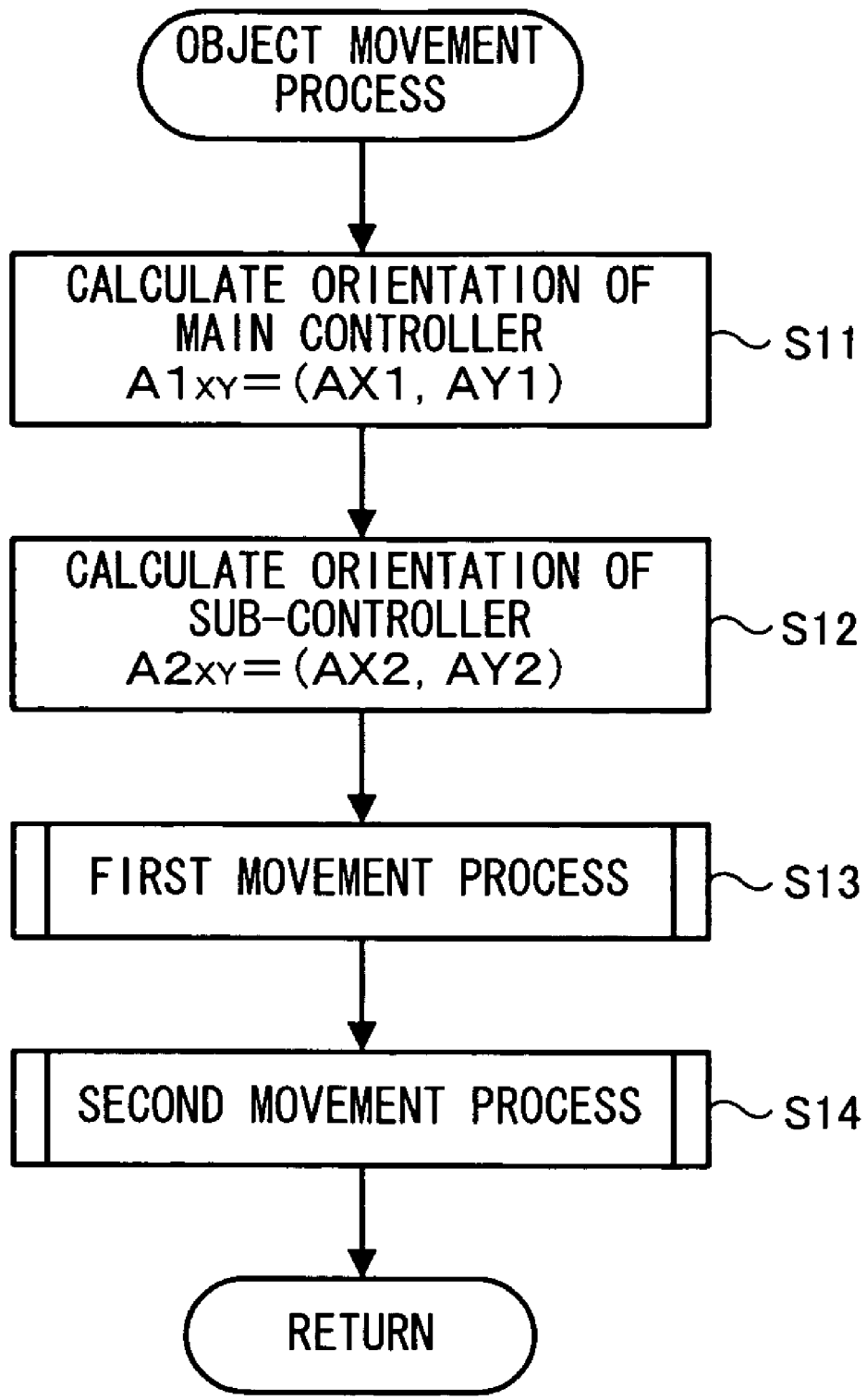
FIG. 17 is a flow chart showing the flow of an object movement process (step S7) shown in FIG. 16.

In step S7, the CPU 10 performs the object movement process. The object movement process is a process of moving the objects 61 to 63, which together form the player object. Referring now to FIG. 17, the details of the object movement process will be described.

FIG. 17 is a flow chart showing the flow of the object movement process (step S7) shown in FIG. 16. First, in step S11 of the object movement process, the CPU 10 calculates the orientation of the main controller 5a about the X axis and the Y axis. The orientation is calculated based on the first acceleration data 721. Specifically, the CPU 10 calculates the two-dimensional vector $A1_{XY}=(AX1, AY1)$ made of the X component and the Y component of the first acceleration vector A1 represented by the first acceleration data 721. The data representing the calculated two-dimensional vector $A1_{XY}$ is stored in the main memory 13 as the first orientation data 733.

Then, in step S12, the CPU 10 calculates the orientation of the sub-controller 5b about the X axis and the Y axis. The orientation is calculated based on the second acceleration data 722. Specifically, the CPU 10 calculates the two-dimensional vector $A2_{XY}=(AX2, AY2)$ made of the X component and the Y component of the second acceleration vector A2 represented by the second acceleration data 722. The data representing the calculated two-dimensional vector $A2_{XY}$ is stored in the main memory 13 as the second orientation data 734.

Then, in step S13, the CPU 10 performs the first movement process. The first movement process is a process of moving the torso object 63 in the game space. The details of the first movement process will now be described with reference to FIG. 18.

Figure 18:
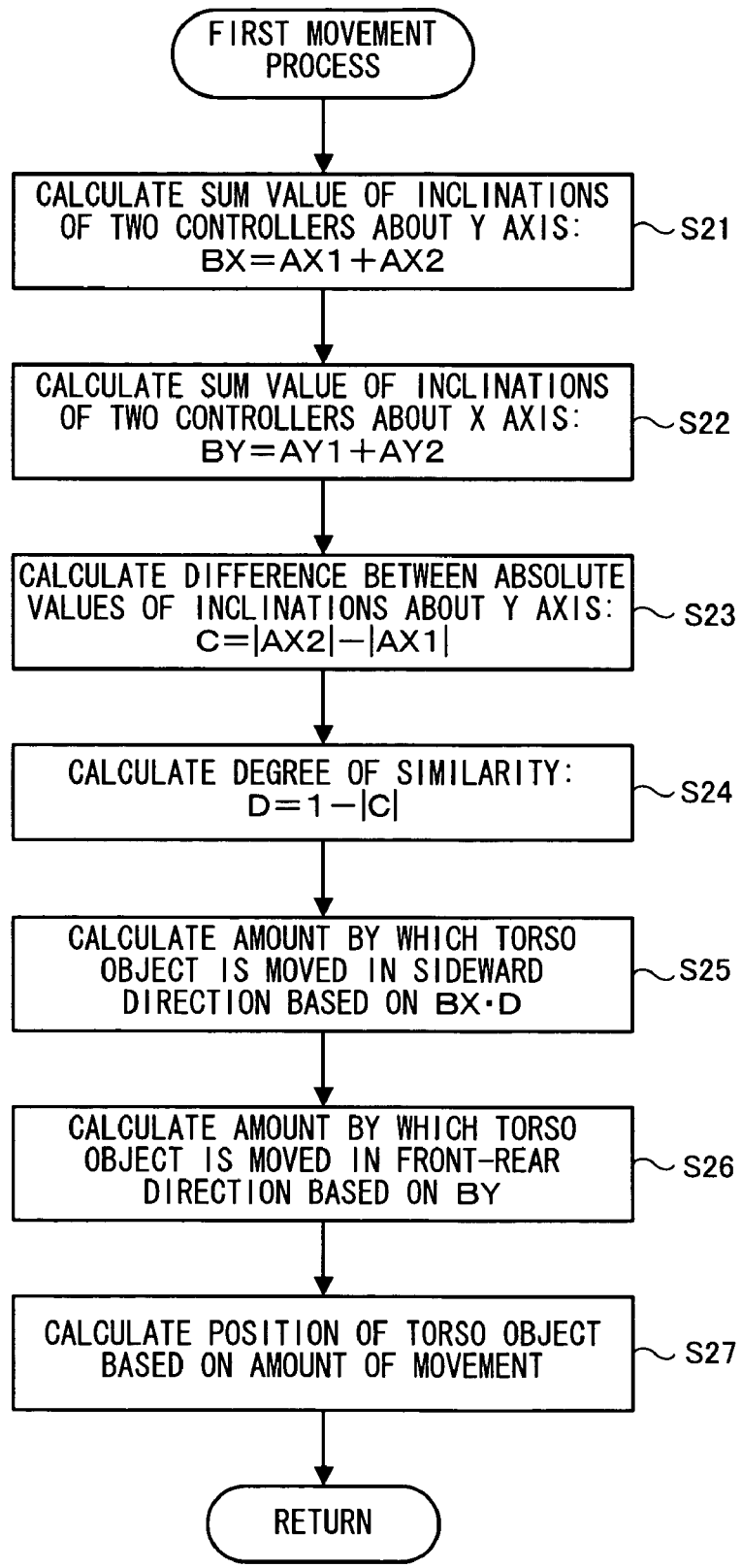
FIG. 18 is a flow chart showing the flow of a first movement process (step S13) shown in FIG. 17.

FIG. 18 is a flow chart showing the flow of the first movement process (step S13) shown in FIG. 17. First, in step S21 of the first movement process, the CPU 10 calculates the sum value obtained by adding together the inclination of the main controller 5a about the Y axis and the inclination of the sub-controller 5b about the Y axis. The inclination of the controller (about the Y axis) as used herein refers to the degree of the inclination with respect to the reference position. The sum value is calculated using the first orientation data 733 and the second orientation data 734 stored in the main memory 13. Specifically, the sum value is the sum of the X component (AX1) of the two-dimensional vector $A1_{XY}$ represented by the first orientation data 733 and the X component (AX2) of the two-dimensional vector $A2_{XY}$ represented by the second orientation data 734. Thus, the sum value BX is calculated as shown in Expression 1 below:

$$BX=AX1+AX2 \qquad \text{Exp. 1}$$

The data representing the calculated sum value is stored in the main memory 13 as the X component sum value data 735.

Then, in step S22, the CPU 10 calculates the sum value of the inclination of the main controller 5a about the X axis and the inclination of the sub-controller 5b about the X axis. The inclination of the controller (about the X axis) as used herein refers to the degree of inclination with respect to the reference position. The sum value is calculated using the first orientation data 733 and the second orientation data 734 stored in the main memory 13. Specifically, the sum value is the sum of the Y component (AY1) of the two-dimensional vector $A1_{XY}$ represented by the first orientation data 733 and the Y component (AY2) of the two-dimensional vector $A2_{XY}$ represented by the second orientation data 734. Thus, the sum value BY is calculated as shown in Expression 2 below:

$$BY = AY1 + AY2 \qquad \text{Exp. 2}$$

The data representing the calculated sum value is stored in the main memory 13 as the Y component sum value data 736.

Then, in step S23, the CPU 10 calculates the difference obtained by subtracting the absolute value of the inclination of the main controller 5a about the Y axis from that of the sub-controller 5b. The difference is calculated using the first orientation data 733 and the second orientation data 734 stored in the main memory 13. Specifically, the difference C is calculated as shown in Expression 3 below:

$$C = |AX2| - |AX1| \qquad \text{Exp. 3}$$

The data representing the calculated difference is stored in the main memory 13 as the difference data 737. In the present embodiment, the difference C is calculated using the absolute values of the inclinations of the controllers 5a and 5b about the Y axis for the purpose of calculating the degree of similarity without distinguishing whether the controller is tilted clockwise or counterclockwise with respect to the reference position. Therefore, in a case where the main controller 5a is tilted by 30° clockwise and the sub-controller 5b is tilted by 30° counterclockwise, the difference C is "0". In other embodiments, the difference C may be calculated by using the inclinations (not the absolute values thereof) of the controllers 5a and 5b about the Y axis. Then, it is possible to calculate the degree of similarity while distinguishing whether the controller is tilted clockwise or counterclockwise.

Then, in step S24, the CPU 10 calculates the degree of similarity. The degree of similarity as used in the present embodiment refers to the degree of similarity between the orientation of the main controller 5a and the orientation of the sub-controller 5b. The degree of similarity is calculated using the difference data 737 stored in the main memory 13. Specifically, the degree of similarity D is calculated as shown in Expression 4 below:

$$D = 1 - |C| \qquad \text{Exp. 4}$$

The data representing the calculated degree of similarity D is stored in the main memory 13 as the degree of similarity data 738.

Then, in step S25, the CPU 10 calculates the amount by which the torso object 63 is moved in the sideward direction. The sideward direction as used herein refers to the left-right direction of the torso object 63 and is also the left-right direction of the screen. The amount of movement is calculated using the X component sum value data 735 and the degree of similarity data 738 stored in the main memory 13. Specifically, the amount of movement is calculated in such a manner that it is greater as the sum value BX represented by the X component sum value data 735 is greater and is greater as the value of the degree of similarity data 738 is greater. For example, the amount of movement can be calculated by multiplying the product between the sum value BX and the degree of similarity D by a predetermined constant. Alternatively, the amount of movement may be calculated by multiplying sum value BX by a predetermined constant only if the degree of similarity D is greater than a predetermined value, whereas the amount of movement is set to zero if the degree of similarity D is less than or equal to the predetermined value. As described above with respect to step S21, the sum value BX is calculated based on the orientation of the main controller 5a and the orientation of the sub-controller 5b. Thus, the amount of movement is calculated based on the orientations of the two controllers 5a and 5b and degree of similarity.

Then, in step S26, the CPU 10 calculates the amount of movement in the front-rear direction of the torso object 63. The front-rear direction as used herein refers to the front-rear direction of the torso object 63 and is the depth direction of the screen. The amount of movement is calculated using the Y component sum value data 736 stored in the main memory 13. Specifically, the amount of movement is calculated in such a manner that it is greater as the sum value BY represented by the Y component sum value data 736 is greater. As described above with respect to step S22, the sum value BY is calculated based on the orientation of the main controller 5a and the orientation of the sub-controller 5b. Therefore, the amount of movement is calculated based on the orientations of the two controllers 5a and 5b.

In the present embodiment, the amount by which the torso object 63 is moved in the sideward direction is calculated using the degree of similarity with respect to the inclination about the Y axis. In other embodiments, the amount of movement in the front-rear direction can also be calculated using the degree of similarity. Specifically, the game device 3 may calculate the degree of similarity with respect to the inclination about the X axis, and determine the amount by which the torso object 63 is moved in the front-rear direction by using the degree of similarity. Then, the amount of movement in the front-rear direction is calculated in such a manner that it is greater as the degree of similarity with respect to the inclination about the X axis is greater. The degree of similarity with respect to the inclination about the X axis can be calculated using the Y component (AY1, AY2) of the acceleration vector, just as the degree of similarity with respect to the inclination about the Y axis is calculated using the X component (AX1, AX2) of the acceleration vector.

If two degrees of similarity, i.e., one with respect to the inclination about the X axis and another with respect to the inclination about the Y axis, are used, they can be calculated separately, and the amount of movement of the torso object 63 in the sideward direction and that in the front-rear direction can be calculated separately. In other embodiments, the amount of movement of the torso object 63 in the sideward direction and that in the front-rear direction can be calculated together. Specifically, the game device 3 calculates the degree of similarity between the XY component $A1_{XY}$ of the acceleration vector corresponding to the orientation of the main controller 5a and the XY component $A2_{XY}$ of the acceleration vector corresponding to the orientation of the sub-controller 5b. For example, the degree of similarity may be calculated as the difference between the two vectors $A1_{XY}$ and $A2_{XY}$ (a vector representing the difference), or may be calculated as the angular difference between the two vectors $A1_{XY}$ and $A2_{XY}$. The degree of similarity is calculated in such a manner that it is greater (higher) as the difference (angular difference) is smaller. Then, the game device 3 corrects the tentative amount of movement calculated based on the vector $A1_{XY}$ and/or the vector $A2_{XY}$ according to the calculated degree of similarity, thus determining the amount of movement.

In step S27, the CPU 10 calculates the position of the torso object 63 based on the amount of movement calculated in steps S25 and S26. Specifically, the new position of the torso object 63 is determined to be a position shifted from the position represented by the torso object data 741 stored in the main memory 13 by the amount of movement calculated in steps S25 and S26. The data representing the determined new position is stored in the main memory 13 as the new torso object data 741, replacing the previous data. In other embodiments, the position and orientation of the torso object 63 may be calculated based on the amount of movement calculated in steps S25 and S26. For example, the orientation of the torso object 63 may be changed if the amount of movement is smaller than a predetermined value, and the position of the torso object 63 may be changed if the amount of movement is greater than or equal to the predetermined value. After step S27, the CPU 10 exits the first movement process.

Referring back to FIG. 17, in step S14 following step S13, the CPU 10 performs the second movement process. The second movement process is a process of moving the right hand and left hand objects 61 and 62 in the game space. The details of the second movement process will now be described with reference to FIG. 19.

Figure 19:
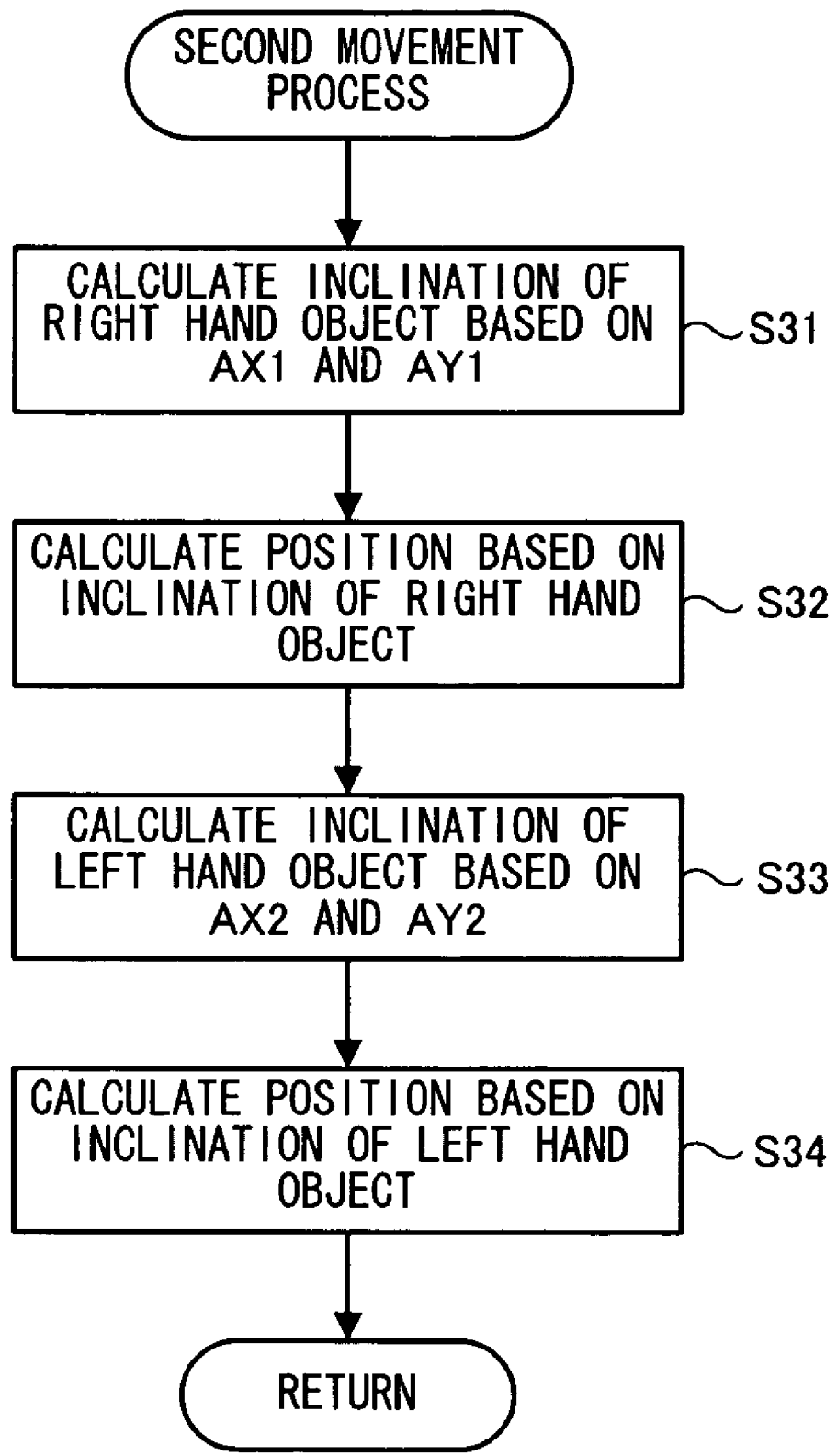
FIG. 19 is a flow chart showing the flow of a second movement process (step S14) shown in FIG. 17.

FIG. 19 is a flow chart showing the flow of a second movement process (step S14) shown in FIG. 17. First, in step S31 of the second movement process, the CPU 10 calculates the inclination (orientation) of the right hand object 61. The inclination of the right hand object 61 is calculated based on the first orientation data 733 stored in the main memory 13. Specifically, the inclination of the right hand object 61 about an axis vertical to the screen is calculated based on the X component of the two-dimensional vector represented by the first orientation data 733. The inclination of the right hand object 61 about an axis parallel to the left-right direction of the screen is calculated based on the Y component of the two-dimensional vector.

Then, in step S32, the CPU 10 calculates the position of the right hand object 61 in the game space. The position is calculated based on the inclination calculated in step S31. In the present embodiment, the position of the right hand object 61 is uniquely determined to be an appropriate position for the inclination. The data representing the inclination and the position calculated in steps S31 and S32 is stored in the main memory 13 as the right hand object data 739.

In step S33, the CPU 10 calculates the inclination (orientation) of the left hand object 62. The inclination of the left hand object 62 is calculated based on the second orientation data 734 stored in the main memory 13. Specifically, the inclination of the left hand object 62 about an axis vertical to the screen is calculated based on the X component of the two-dimensional vector represented by the second orientation data 734. The inclination of the left hand object 62 about an axis parallel to the left-right direction of the screen is calculated based on the Y component of the two-dimensional vector.

Then, in step S34, the CPU 10 calculates the position of the left hand object 62 in the game space. The position is calculated based on the inclination calculated in step S33. In the present embodiment, the position of the left hand object 62 is uniquely determined to be an appropriate position for the inclination. The data representing the inclination and the position calculated in steps S33 and S34 is stored in the main memory 13 as the left hand object data 740. After step S34, the CPU 10 exits the second movement process. Referring back to FIG. 17, after the second movement process (step S14), the CPU 10 exits the object movement process.

Referring back to FIG. 16, after the object movement process (step S7), the process proceeds to step S8. In step S8, a game image reflecting the game operation by the player is produced, and the produced game image is displayed on the screen of the TV 2. The game image is produced by using the object data 739 to 741 stored in the main memory 13 in the object movement process step S7. Specifically, the game image is produced and displayed so that the objects 61 to 63 are in their positions and orientations as represented by the object data 739 to 741, respectively. Before step S8, the CPU 10 performs the process of controlling the action of the enemy object 64, the process of determining whether a punch from the enemy object 64 has hit the player object, the process of calculating the amount of damage on the player object when the punch hits the player object, etc. The game image reflects the results of these processes.

Then, in step S9, the CPU 10 determines whether the game is over. For example, the determination of step S9 is made based on criteria such as whether the player object or the enemy object has received a predetermined amount of damage or a predetermined amount of time has elapsed since the start of the game. If the determination result of step S9 is false, the process returns to step S1. Thereafter, steps S1 to S9 are repeated until the determination result of step S9 is true. When the determination result of step S9 is true, the CPU 10 exits the game process shown in FIG. 16.

In the game process as described above, the player performs game operations by performing the left-right turning operation and the front-rear turning operation on the main controller 5a and the sub-controller 5b. Specifically, when the left-right turning operation and/or the front-rear turning operation is performed on the main controller 5a, the position and orientation of the right hand object 61 are changed through the second movement process (step S14) (steps S31 and S32). When the left-right turning operation and/or the front-rear turning operation is performed on the sub-controller 5b, the position and orientation of the left hand object 62 are changed by the second movement process (step S14) (steps S33 and S34). When the left-right turning operation and/or the front-rear turning operation is performed on both the main controller 5a and the sub-controller 5b, the position of the torso object 63 is changed through the first movement process (step S13) (steps S26 and S27). Thus, in the present embodiment, the player can control three objects (the objects 61 to 63) with two input devices (the controllers 5a and 5b). In other words, with the present embodiment, three objects can be controlled with a simple configuration using only two input devices.

Moreover, in the present embodiment, the movement of the torso object 63 reflects the degree of similarity as described above. Specifically, the amount of movement of the torso object 63 is greater as the degree of similarity is greater (step S25). Therefore, the torso object 63 moves over a greater distance when the two controllers 5a and 5b are tilted similarly, and the torso object 63 moves over a shorter distance when the inclinations (orientations) of the two controllers 5a and 5b differ from each other. Therefore, if the player controls the two controllers 5a and 5b in the same manner with an intention to move the torso object 63, the degree of similarity will be high, whereby there will be a greater amount of movement of the torso object 63. If the player does not intend to move the torso object 63, the degree of similarity will be small, whereby there will be little movement of the torso object 63. For example, when the player moves only one of the two controllers 5a and 5b or moves the two controllers 5a and 5b differently (e.g., performing the left-right turning operation on one controller and the front-rear turning operation on the other controller), there will be little movement of the torso object 63. As described above, in the present embodiment, the degree of similarity is used for the third operation where the two controllers 5a and 5b are used, whereby the third operation can be clearly distinguished from the first and second operations where one controller is used. Thus, the player can perform the three types of operations independently, thereby facilitating the control of the three control objects.

In the present embodiment, it is determined whether a punch operation is performed with the main controller 5a or the sub-controller 5b (step S3, S5). When a punch operation is performed (when the determination result of step S3 or S5 is true), the object movement process (step S7) is not performed. While a punch operation is being performed, the controller is being moved rapidly, whereby it is likely that the orientation of the controller cannot be calculated correctly. If the orientation of the controller cannot be calculated correctly, an operation not intended by the player may be performed. Therefore, in the present embodiment, the object movement process is not performed while a punch operation is performed, thereby preventing the orientation of the controller from being calculated incorrectly. Thus, it is possible to prevent an operation not intended by the player. Moreover, it is possible to clearly distinguish between a punch operation and an object moving operation.

While the present embodiment is directed to a boxing game, the present invention is applicable to other types of video games. For example, the present invention is applicable to a video game where the player controls an object having a sword and a shield. Specifically, the present invention can be applied to a video game where the right hand holding a sword, the left hand holding a shield, and the torso are controlled by using the main controller 5a and the sub-controller 5b, whereby similar effects to those described above can be realized. The present invention is also applicable to video games where the player controls a car, e.g., racing games. Specifically, the steering wheel may be controlled through an operation similar to the third operation using the main controller 5a and the sub-controller 5b, while the player may change gear through an operation similar to the punch operation using the main controller 5a or the sub-controller 5b.

In the present embodiment, the orientation of the controller is calculated by using an acceleration sensor, and the game process is performed based on the orientation of the controller. Moreover, the degree of similarity between the orientations of two controllers is calculated. In other embodiments, the amount of change in the orientation of each controller over a predetermined unit amount of time (e.g., one frame) may be calculated so as to calculate the degree of similarity between the controllers with respect to the amount of change in the orientation. The amount of change in the orientation may be calculated in such a manner that the amount of change with respect to the inclination (orientation) about the X axis and the amount of change in the inclination (orientation) about the Y axis are calculated separately, or they may be calculated together as a single amount of change. In the former case, the amount of change in the inclination about the X axis, for example, can be represented as the difference between the Y component of the acceleration vector obtained in step S1 shown in FIG. 16 and the Y component of the acceleration vector obtained in step S1 in the next iteration. In the latter case, the amount of change can be represented as the difference between the XY component of the acceleration vector obtained in step S1 shown in FIG. 16 and the XY component of the acceleration vector obtained in step S1 in the next iteration. The difference may be a difference between two vectors, or an angular difference therebetween. The degree of similarity is calculated based on the difference between the amounts of change calculated for the two controllers as described above. Specifically, the degree of similarity is calculated in such a manner that it is greater (higher) as the difference is smaller.

In other embodiments, the movement of each controller may be calculated, instead of the orientation thereof, and the game process may be performed based on the movement of the controllers. Moreover, the degree of similarity in movement between the two controllers may be calculated. Specifically, the direction in which a controller is moved (or swung) can be calculated by using an acceleration sensor. The movement of a controller may also be represented as the amount of change in the acceleration vector over a unit amount of time. For example, in a boxing game of the present embodiment, a punch may be thrown with the right hand object 61 in a direction according to the direction in which the main controller 5a is moved, and a punch may be thrown with the left hand object 62 in a direction according to the direction in which the sub-controller 5b is moved. Moreover, the torso object 63 may be moved in a direction according to the direction in which the main controller 5a and the sub-controller 5b are moved. Moreover, the amount of movement of the torso object 63 may be determined while reflecting the degree of similarity, as described above. The degree of similarity may be calculated based on the difference between the vector representing the direction of movement of the main controller 5a and that of the sub-controller 5b, or based on the angular difference between the direction of movement of the main controller 5a and that of the sub-controller 5b. Specifically, the degree of similarity may be calculated in such a manner that the degree of similarity is greater (higher) as the angular difference is smaller.

As described above, the present invention can be used in a game device or a game program, for example, aiming at realizing a video game where the player can control a plurality of objects with a simple configuration While the invention has been described in detail, the foregoing description is in all aspects illustrative and not restrictive. It is understood that numerous other modifications and variations can be devised without departing from the scope of the invention.

What is claimed is:

1. A non-transitory computer-readable storage medium, storing a game program to be executed by a computer of a game device for performing a game process based on data outputted from a first sensor and data outputted from a second sensor, wherein the first sensor outputs first data representing a value according to an orientation or movement of a first input device and the second sensor outputs second data representing a value according to an orientation or movement of a second input device, the program instructing the computer to perform:

a data obtaining step of obtaining the first data and the second data;

a similarity degree calculating step of calculating, based on the first data and the second data, a degree of similarity between a state of the first input device with respect to the orientation or movement thereof and a state of the second input device with respect to the orientation or movement thereof;

a game controlling step of controlling the game process based on at least one of the first data and the second data and the degree of similarity.

2. The storage medium according to claim 1, wherein:
the first sensor is an acceleration sensor outputting data representing an acceleration as the first data; and
the second sensor is an acceleration sensor outputting data representing an acceleration as the second data.

3. The storage medium according to claim 2, wherein:
the first data represents an acceleration value with respect to a predetermined single axial direction with reference to the first input device;
the second data represents an acceleration value with respect to a predetermined single axial direction with reference to the second input device; and
in the similarity degree calculating step, the computer calculates the degree of similarity based on a difference between the value of the first data and the value of the second data.

4. The storage medium according to claim 3, wherein the degree of similarity calculated in the similarity degree calculating step takes a higher value as the difference is smaller.

5. The storage medium according to claim 2, wherein:
the first data represents a vector whose components are acceleration values with respect to a plurality of predetermined axial directions with reference to the first input device;
the second data represents a vector whose components are acceleration values with respect to a plurality of predetermined axial directions with reference to the second input device; and
in the similarity degree calculating step, the computer calculates the degree of similarity based on a difference between the vector represented by the first data and the vector represented by the second data.

6. The storage medium according to claim 5, wherein the degree of similarity calculated in the similarity degree calculating step takes a higher value as the difference between the vectors is smaller.

7. The storage medium according to claim 2, wherein:
the first data represents a vector whose components are acceleration values with respect to a plurality of predetermined axial directions with reference to the first input device;
the second data represents a vector whose components are acceleration values with respect to a plurality of predetermined axial directions with reference to the second input device; and
in the similarity degree calculating step, the computer calculates the degree of similarity based on a difference between a vector representing an amount of change in the vector represented by the first data over a predetermined amount of time and a vector representing an amount of change in the vector represented by the second data over the predetermined amount of time.

8. The storage medium according to claim 7, wherein the degree of similarity calculated in the similarity degree calculating step takes a higher value as the difference between the vectors is smaller.

9. The storage medium according to claim 2, wherein:
the first data represents a vector whose components are acceleration values with respect to a plurality of predetermined axial directions with reference to the first input device;
the second data represents a vector whose components are acceleration values with respect to a plurality of predetermined axial directions with reference to the second input device; and
in the similarity degree calculating step, the computer calculates the degree of similarity based on an angular difference between a vector representing an amount of change in the vector represented by the first data over a predetermined amount of time and a vector representing an amount of change in the vector represented by the second data over the predetermined amount of time.

10. The storage medium according to claim 9, wherein the degree of similarity calculated in the similarity degree calculating step takes a higher value as the angular difference between the vectors is smaller.

11. The storage medium according to claim 2, wherein:
the first data represents a vector whose components are acceleration values with respect to a plurality of predetermined axial directions with reference to the first input device;
the second data represents a vector whose components are acceleration values with respect to a plurality of predetermined axial directions with reference to the second input device; and
in the similarity degree calculating step, the computer calculates the degree of similarity based on an angular difference between a vector represented by the first data and a vector represented by the second data.

12. The storage medium according to claim 11, wherein the degree of similarity calculated in the similarity degree calculating step takes a higher value as the angular difference between the vectors is smaller.

13. The storage medium according to claim 1, wherein:
the first sensor outputs vector data representing an orientation of the first input device as the first data;
the second sensor outputs vector data representing an orientation of the second input device as the second data; and
in the similarity degree calculating step, the computer calculates a degree of similarity between an orientation of the first input device and an orientation of the second input device.

14. The storage medium according to claim 1, wherein the game controlling step of controlling the game process includes a change amount calculating step of calculating based on at least one of the first data and the second data, an amount of change by which to change a value of a game parameter such that the amount of change is greater as the degree of similarity is greater.

15. The storage medium according to claim 14, wherein in the change amount calculating step, the computer calculates an amount of movement by which to move a first object in a game space in such a manner that the amount of movement is greater as the degree of similarity is greater.

16. The storage medium according to claim 15, wherein the game program instructs the computer to further perform an object movement step of moving a second object in the game space based on the first data and moving a third object in the game space based on the second data.

17. The storage medium according to claim 16, wherein:
the first object is an object representing a torso or a head of a human-shaped character; and
one of the second object and the third object is an object representing a right hand of the human-shaped character and the other is an object representing a left hand thereof.

18. The storage medium according to claim 14, wherein the game program instructs the computer to further perform:
a first determination step of determining, based on the first data, whether the first input device is subjected to an operation that gives a rapid change to an orientation or position of the first input device, the degree of rapidness of the rapid change being greater than or equal to a predetermined degree; and a second determination step of determining, based on the second data, whether the second input device is subjected to an operation that gives a rapid change to an orientation or position of the second input device, the degree of rapidness of the rapid change being greater than or equal to a predetermined degree, wherein in the similarity degree calculating step, the computer calculates a degree of similarity between the orientation of the first input device and that of the second input device only if a determination result of the first determination step and that of the second determination step are both false.

19. The storage medium according to claim 18, wherein the game program instructs the computer to further perform an action control step of activating a predetermined action of the first object or other objects only if at least one of the determination result of the first determination step and that of the second determination step is true, wherein in the change amount calculating step, the computer calculates, as the amount of change, an amount of movement by which the first object is moved in a game space only if the determination result of the first determination step and that of second determination step are both false.

20. A non-transitory computer-readable storage medium, storing a game program to be executed by a computer of a game device for performing a game process based on data outputted from a first sensor and data outputted from a second sensor, wherein the first sensor outputs first data representing a value according to an orientation or movement of a first input device and the second sensor outputs second data representing a value according to an orientation or movement of a second input device, the program instructing the computer to perform:

a data obtaining step of obtaining the first data and the second data;

a similarity degree calculating step of calculating, based on the first data and the second data, a degree of similarity between a state of the first input device with respect to the orientation or movement thereof and a state of the second input device with respect to the orientation or movement thereof;

a first game process step of performing a first game process based on the first data or the second data; and a second game process step of performing a second game process based on the first data and the second data only if a value of the degree of similarity is greater than a predetermined value.

21. The storage medium according to claim 20, wherein in the second game process step, the computer performs, as the second game process, a process of calculating, based on at least one of the first data and the second data, an amount of change by which to change a value of a game parameter to be used in the game process in such a manner that the amount of change is greater as the degree of similarity is greater.

22. The storage medium according to claim 20, wherein:
the first sensor is an acceleration sensor outputting data representing an acceleration as the first data; and
the second sensor is an acceleration sensor outputting data representing an acceleration as the second data.

23. The storage medium according to claim 22, wherein:
the first data represents an acceleration value with respect to a predetermined single axial direction with reference to the first input device;

the second data represents an acceleration value with respect to a predetermined single axial direction with reference to the second input device; and in the similarity degree calculating step, the computer calculates the degree of similarity based on a difference between a value of the first data and a value of the second data.

24. The storage medium according to claim 23, wherein the degree of similarity calculated in the similarity degree calculating step takes a higher value as the difference is smaller.

25. The storage medium according to claim 22, wherein:
the first data represents a vector whose components are acceleration values with respect to a plurality of predetermined axial directions with reference to the first input device;

the second data represents a vector whose components are acceleration values with respect to a plurality of predetermined axial directions with reference to the second input device; and in the similarity degree calculating step, the computer calculates the degree of similarity based on a difference between a vector represented by the first data and a vector represented by the second data.

26. The storage medium according to claim 25, wherein the degree of similarity calculated in the similarity degree calculating step takes a higher value as the difference between the vectors is smaller.

27. The storage medium according to claim 22, wherein:
the first data represents a vector whose components are acceleration values with respect to a plurality of predetermined axial directions with reference to the first input device;

the second data represents a vector whose components are acceleration values with respect to a plurality of predetermined axial directions with reference to the second input device; and in the similarity degree calculating step, the computer calculates the degree of similarity based on a difference between a vector representing an amount of change in the vector represented by the first data over a predetermined amount of time and a vector representing an amount of change in the vector represented by the second data over the predetermined amount of time.

28. The storage medium according to claim 27, wherein the degree of similarity calculated in the similarity degree calculating step takes a higher value as the difference between the vectors is smaller.

29. The storage medium according to claim 22, wherein:
the first data represents a vector whose components are acceleration values with respect to a plurality of predetermined axial directions with reference to the first input device;

the second data represents a vector whose components are acceleration values with respect to a plurality of predetermined axial directions with reference to the second input device; and in the similarity degree calculating step, the computer calculates the degree of similarity based on an angular difference between a vector representing an amount of change in the vector represented by the first data over a predetermined amount of time and a vector representing an amount of change in the vector represented by the second data over the predetermined amount of time.

30. The storage medium according to claim 29, wherein the degree of similarity calculated in the similarity degree calculating step takes a higher value as the angular difference between the vectors is smaller.

31. The storage medium according to claim 22, wherein:
- the first data represents a vector whose components are acceleration values with respect to a plurality of predetermined axial directions with reference to the first input device;
- the second data represents a vector whose components are acceleration values with respect to a plurality of predetermined axial directions with reference to the second input device; and
- in the similarity degree calculating step, the computer calculates the degree of similarity based on an angular difference between a vector represented by the first data and a vector represented by the second data.

32. The storage medium according to claim 31, wherein the degree of similarity calculated in the similarity degree calculating step takes a higher value as the angular difference between the vectors is smaller.

33. The storage medium according to claim 20, wherein:
- the first sensor outputs vector data representing an orientation of the first input device as the first data;
- the second sensor outputs vector data representing an orientation of the second input device as the second data; and
- in the similarity degree calculating step, the computer calculates a degree of similarity between an orientation of the first input device and an orientation of the second input device.

34. A game device for performing a game process based on data outputted from a first sensor and data outputted from a second sensor, wherein the first sensor outputs first data representing a value according to an orientation or movement of a first input device and the second sensor outputs second data representing a value according to an orientation or movement of a second input device, the game device comprising:
- a data obtaining section for obtaining the first data from the first sensor and the second data from the second sensor;
- a similarity degree calculating section for calculating, based on the first data and the second data, a degree of similarity between a state of the first input device with respect to the orientation or movement thereof and a state of the second input device with respect to the orientation or movement thereof;
- a game controlling section for controlling the game process based on at least one of the first data and the second data and the degree of similarity.

35. The storage medium according to claim 34, further comprising:
- a change amount calculating section for calculating, based on at least one of the first data and the second data, an amount of change by which to change a value of a game parameter to be used in the game process in such a manner that the amount of change is greater as the degree of similarity is greater.

36. A game device for performing a game process based on data outputted from a first sensor and data outputted from a second sensor, wherein the first sensor outputs first data representing a value according to an orientation or movement of a first input device and the second sensor outputs second data representing a value according to an orientation or movement of a second input device, the game device comprising:
- a data obtaining section for obtaining the first data from the first sensor and the second data from the second sensor;
- a similarity degree calculating section for calculating, based on the first data and the second data, a degree of similarity between a state of the first input device with respect to the orientation or movement thereof and a state of the second input device with respect to the orientation or movement thereof;
- a first game process section for performing a first game process based on the first data or the second data; and
- a second game process section for performing a second game process based on the first data and the second data only if a value of the degree of similarity is greater than a predetermined value.

* * * * *